(12) United States Patent  (10) Patent No.: US 8,893,107 B2
Nagao et al.  (45) Date of Patent: Nov. 18, 2014

(54) INFORMATION PROCESSING APPARATUS, INFORMATION PROCESSING METHOD, AND INFORMATION PROCESSING PROGRAM FOR UPDATING A DATA SET

(71) Applicants: Masafumi Nagao, Kanagawa (JP); Eijiro Inoue, Kanagawa (JP); Yasukiyo Nakamura, Kanagawa (JP)

(72) Inventors: Masafumi Nagao, Kanagawa (JP); Eijiro Inoue, Kanagawa (JP); Yasukiyo Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 46 days.

(21) Appl. No.: 13/709,289

(22) Filed: Dec. 10, 2012

(65) Prior Publication Data
US 2013/0179871 A1  Jul. 11, 2013

(30) Foreign Application Priority Data

Jan. 6, 2012 (JP) .................................. 2012-001417

(51) Int. Cl.
G06F 9/44 (2006.01)
G06F 9/445 (2006.01)
(52) U.S. Cl.
CPC ........................................ G06F 8/65 (2013.01)
USPC .......................................................... 717/170
(58) Field of Classification Search
None
See application file for complete search history.

(56) References Cited

U.S. PATENT DOCUMENTS

| 5,732,275 | A  | * | 3/1998  | Kullick et al. ................ | 717/170 |
| 6,113,652 | A  | * | 9/2000  | Lysik et al. .................... | 717/170 |
| 6,317,880 | B1 | * | 11/2001 | Chamberlain et al. ........ | 717/174 |
| 7,594,107 | B1 | * | 9/2009  | Parkhill ........................ | 713/156 |
| 8,578,361 | B2 | * | 11/2013 | Cassapakis et al. .......... | 717/168 |
| 2001/0049263 | A1 | * | 12/2001 | Zhang ........................... | 455/67.1 |
| 2003/0035139 | A1 | * | 2/2003  | Tomita et al. ................ | 358/1.15 |
| 2004/0103412 | A1 | * | 5/2004  | Rao et al. ...................... | 717/171 |
| 2004/0243994 | A1 |   | 12/2004 | Nasu |  |
| 2005/0085222 | A1 | * | 4/2005  | Przybilski et al. ............ | 455/418 |
| 2007/0074201 | A1 | * | 3/2007  | Lee ............................... | 717/173 |

FOREIGN PATENT DOCUMENTS

JP  2004-318838  11/2004
JP  2011-044106  3/2011

* cited by examiner

*Primary Examiner* — Don Wong
*Assistant Examiner* — Daxin Wu
(74) *Attorney, Agent, or Firm* — Oblon, Spivak, McClelland, Maier & Neustadt, L.L.P.

(57) ABSTRACT

An information processing apparatus includes a storage unit to store data set including version information; an acquiring unit to acquire update-use data set including version information; a providing unit to provide the version information read from the storage unit; a updating management unit to determine whether updating of the data set stored in the storage unit is required, when determined that updating is required based on the acquired version information and the provided version information, updating the data set stored in the storage unit using the update-use data set; and a updating completion determination unit to determine whether the updating of data set by the updating management unit is completed, when determined that the updating of the data set is not completed correctly, the providing unit provides specific version information indicating the updating is not completed correctly instead of the version information stored in the storage unit.

15 Claims, 25 Drawing Sheets

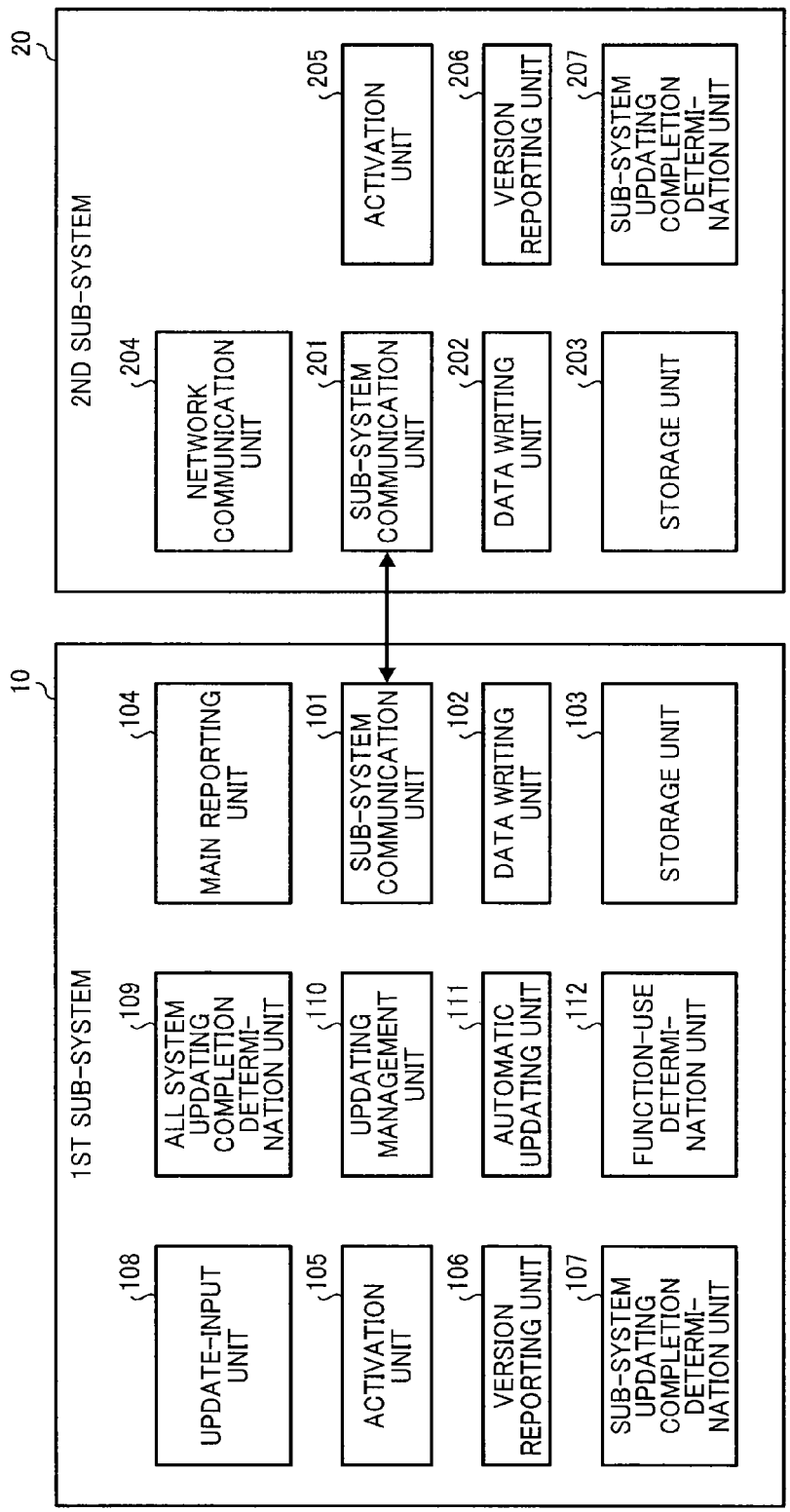

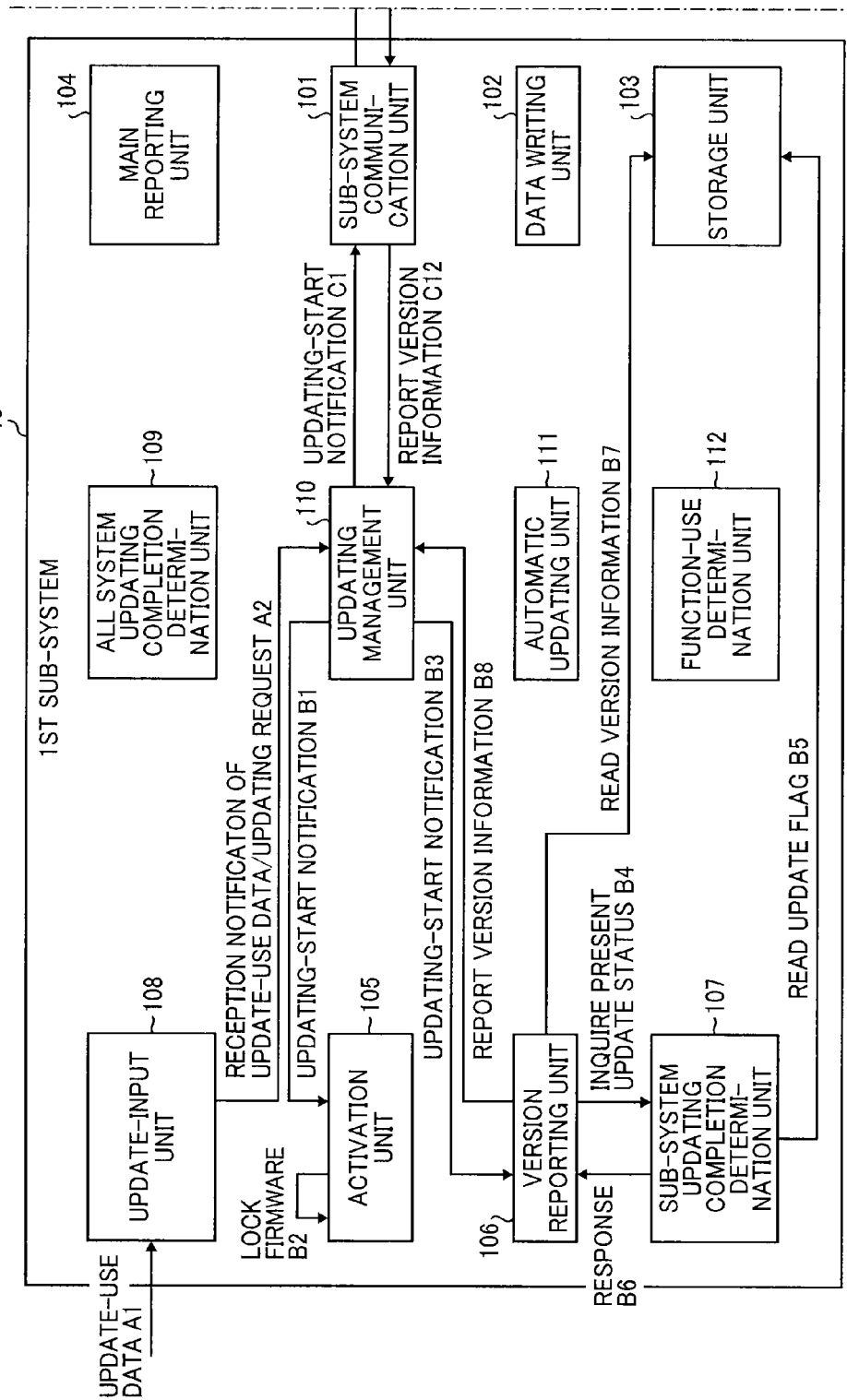

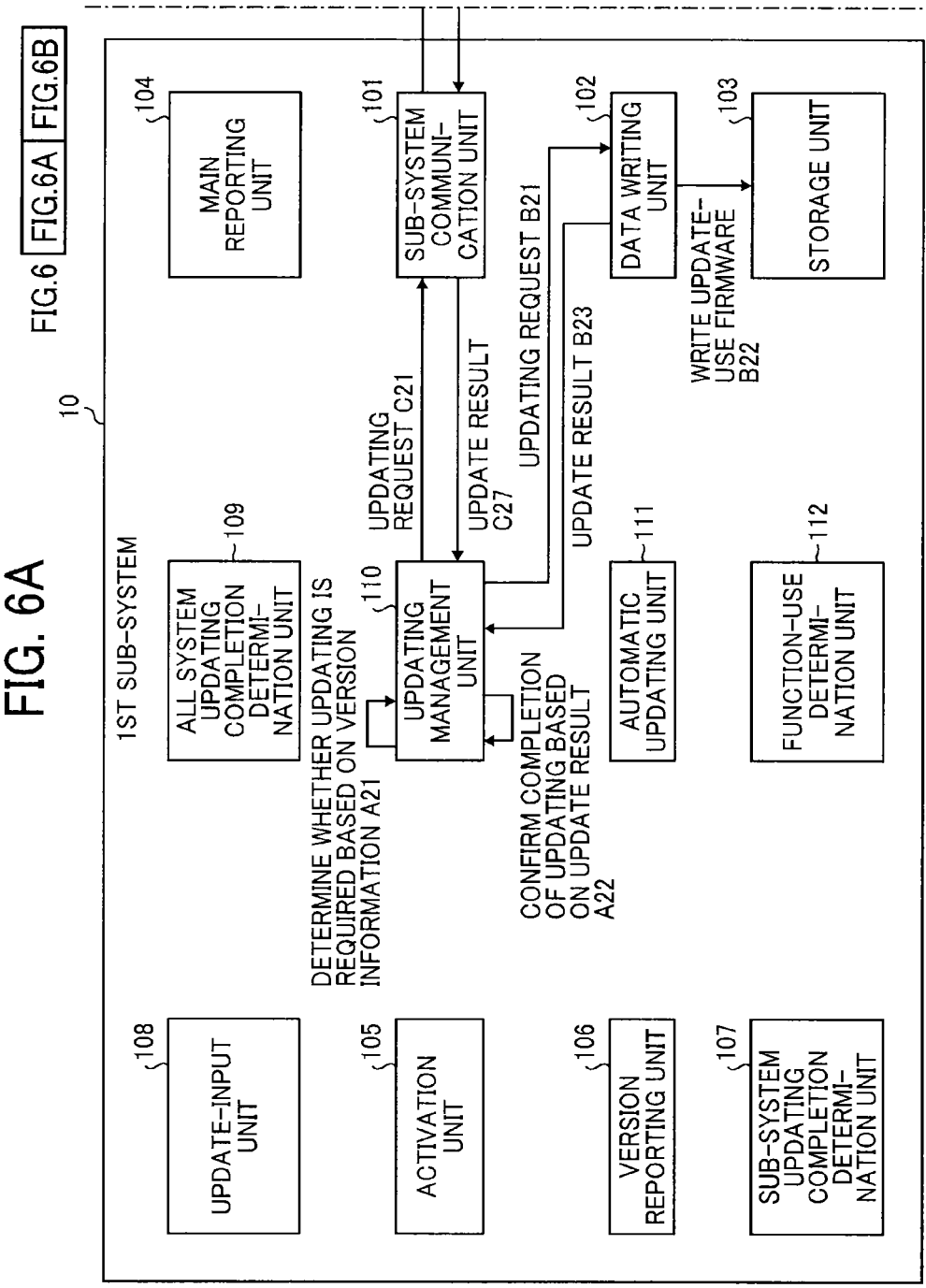

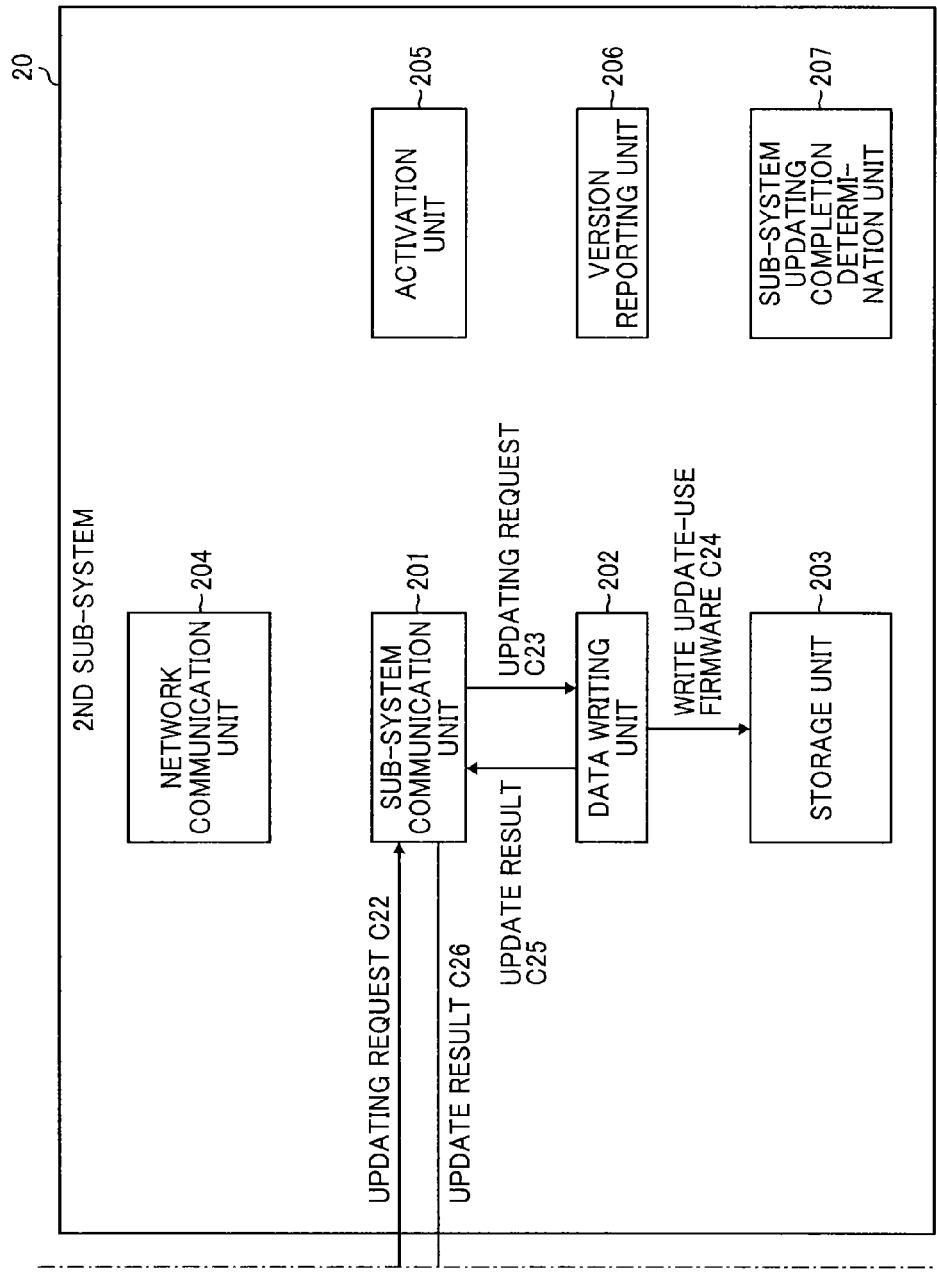

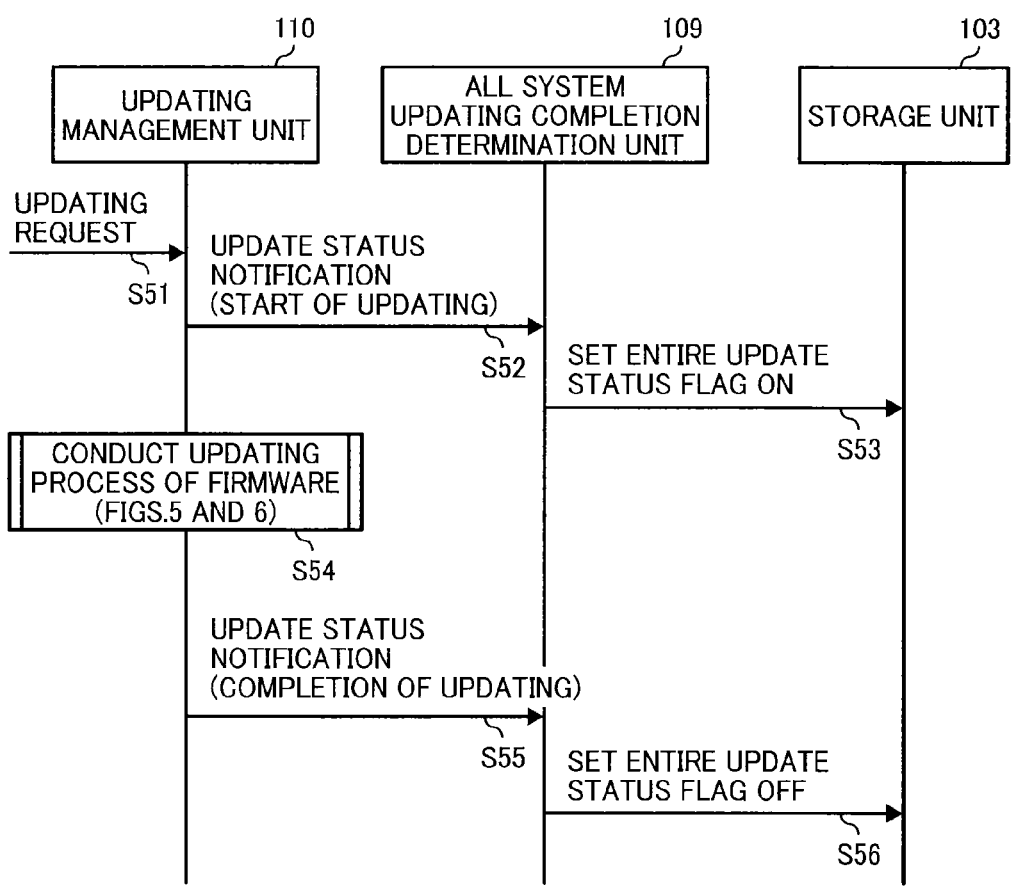

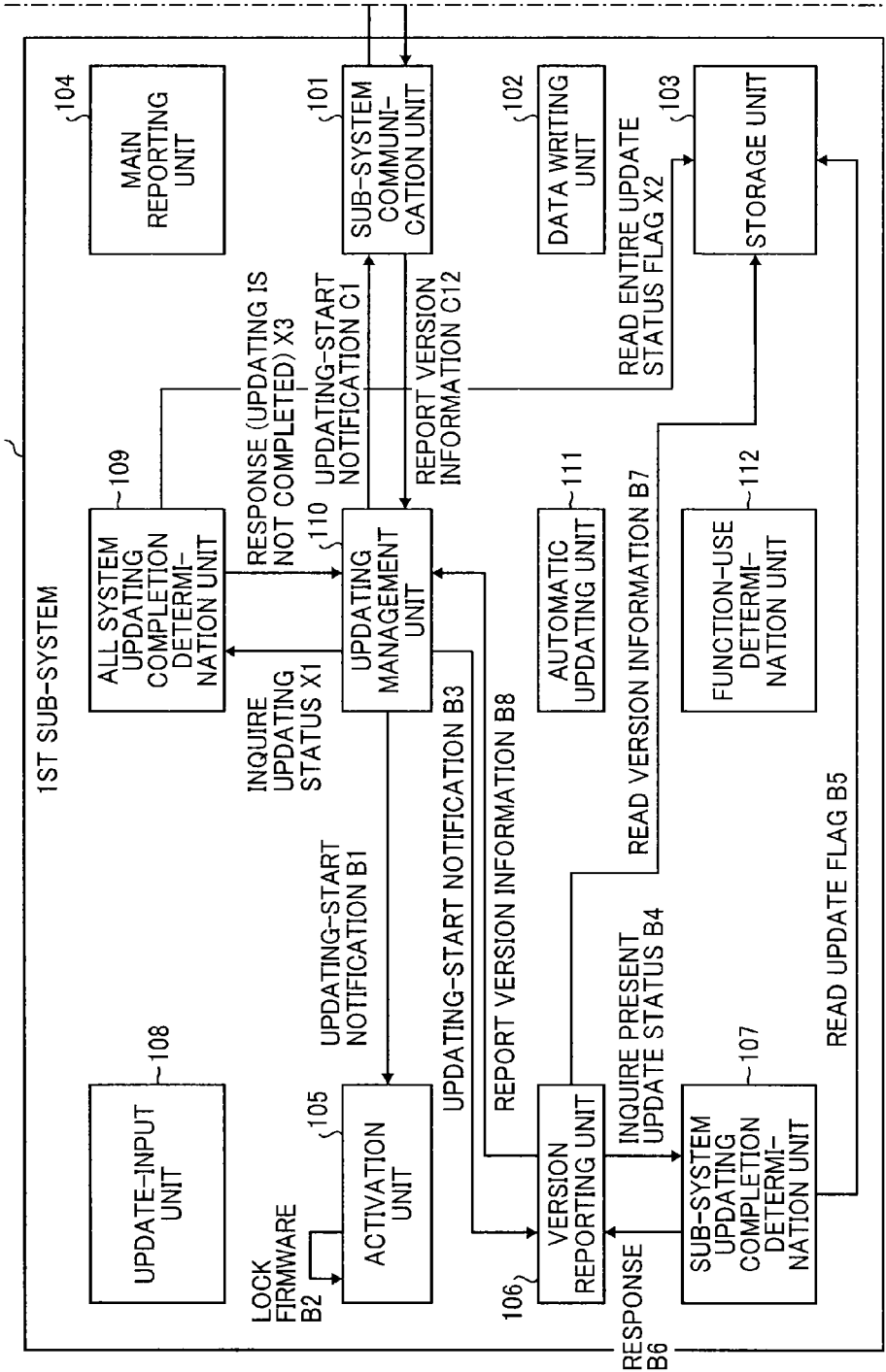

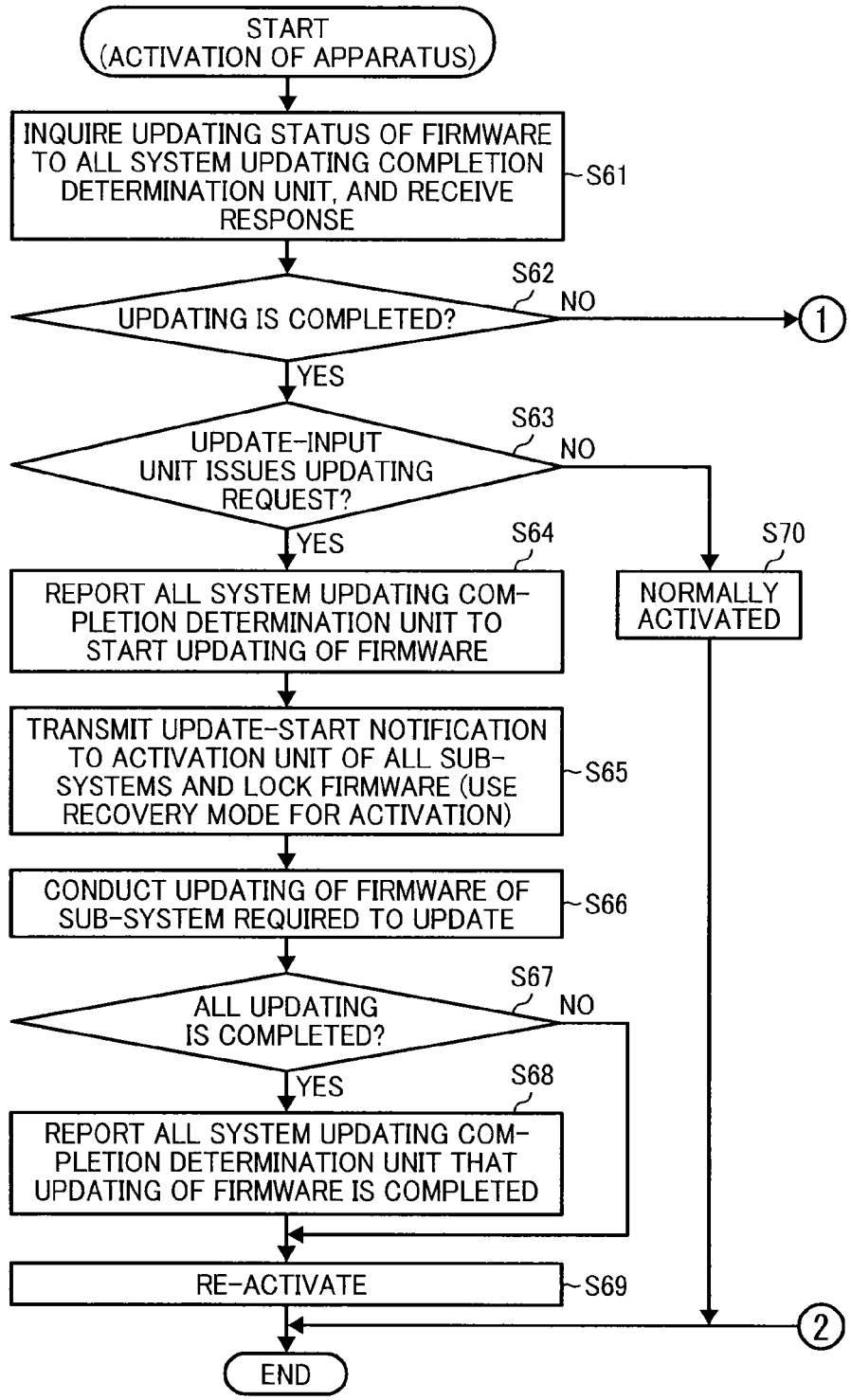

| FUNCTION | SUB-SYSTEM 1 | SUB-SYSTEM 2 | SUB-SYSTEM 3 |
|---|---|---|---|
| FUNCTION A | USE | NOT USE | NOT USE |
| FUNCTION B | USE | USE | USE |
| FUNCTION C | USE | NOT USE | USE |
| ⋮ | ⋮ | ⋮ | ⋮ |

| SUB-SYSTEM | FIRMWARE STATUS |
|---|---|
| SUB-SYSTEM 1 | IN ACTIVATION |
| SUB-SYSTEM 2 | NOT IN ACTIVATION |
| SUB-SYSTEM 3 | IN ACTIVATION |
| ⋮ | ⋮ |

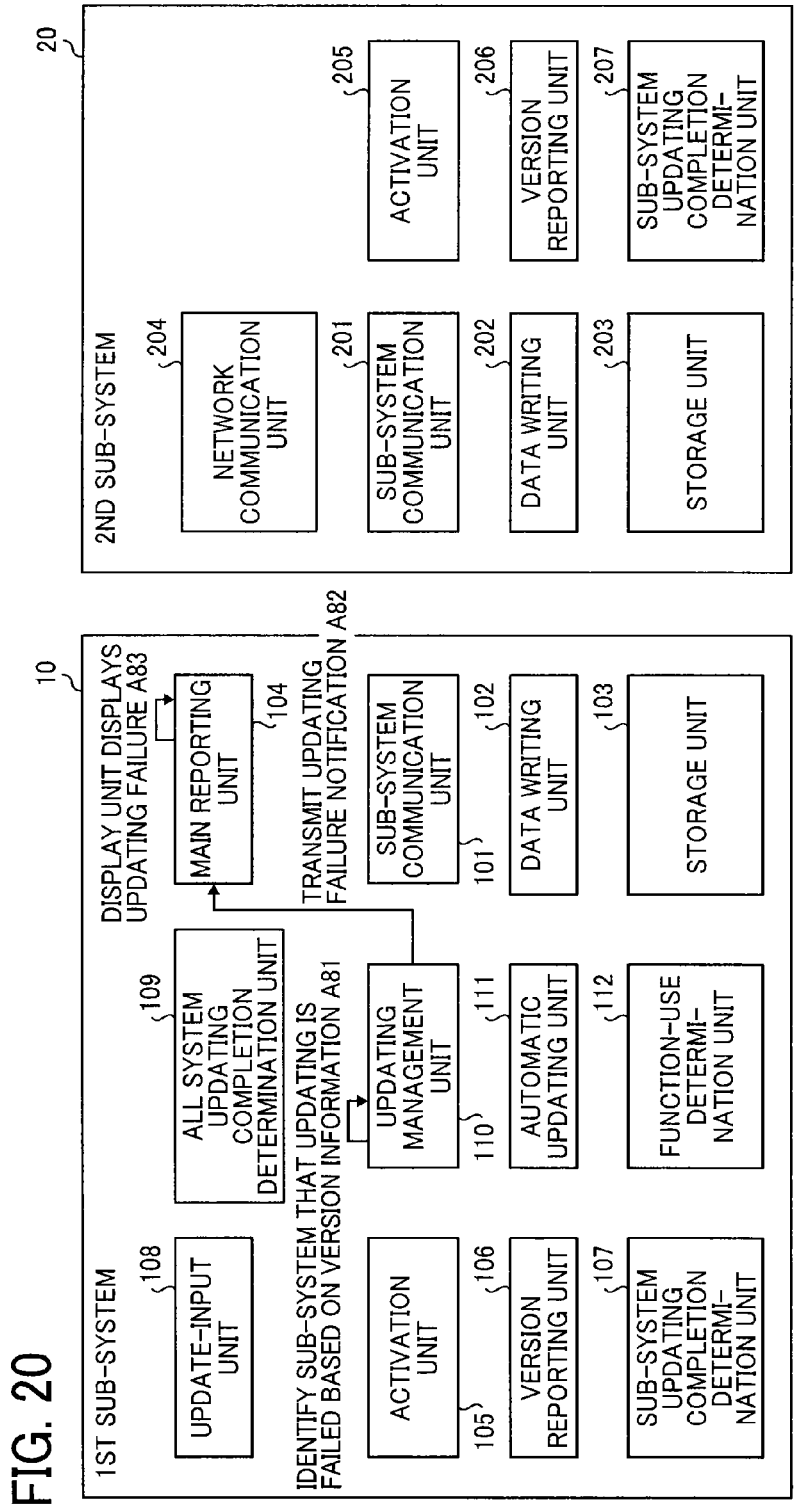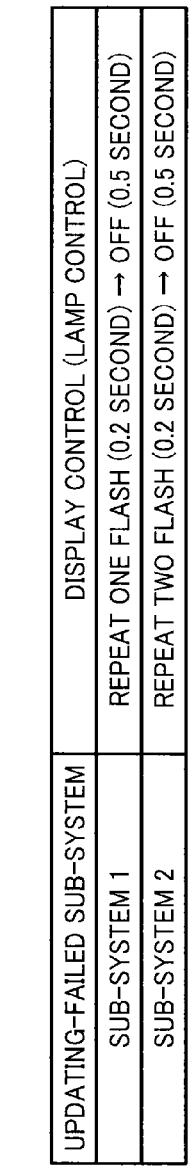

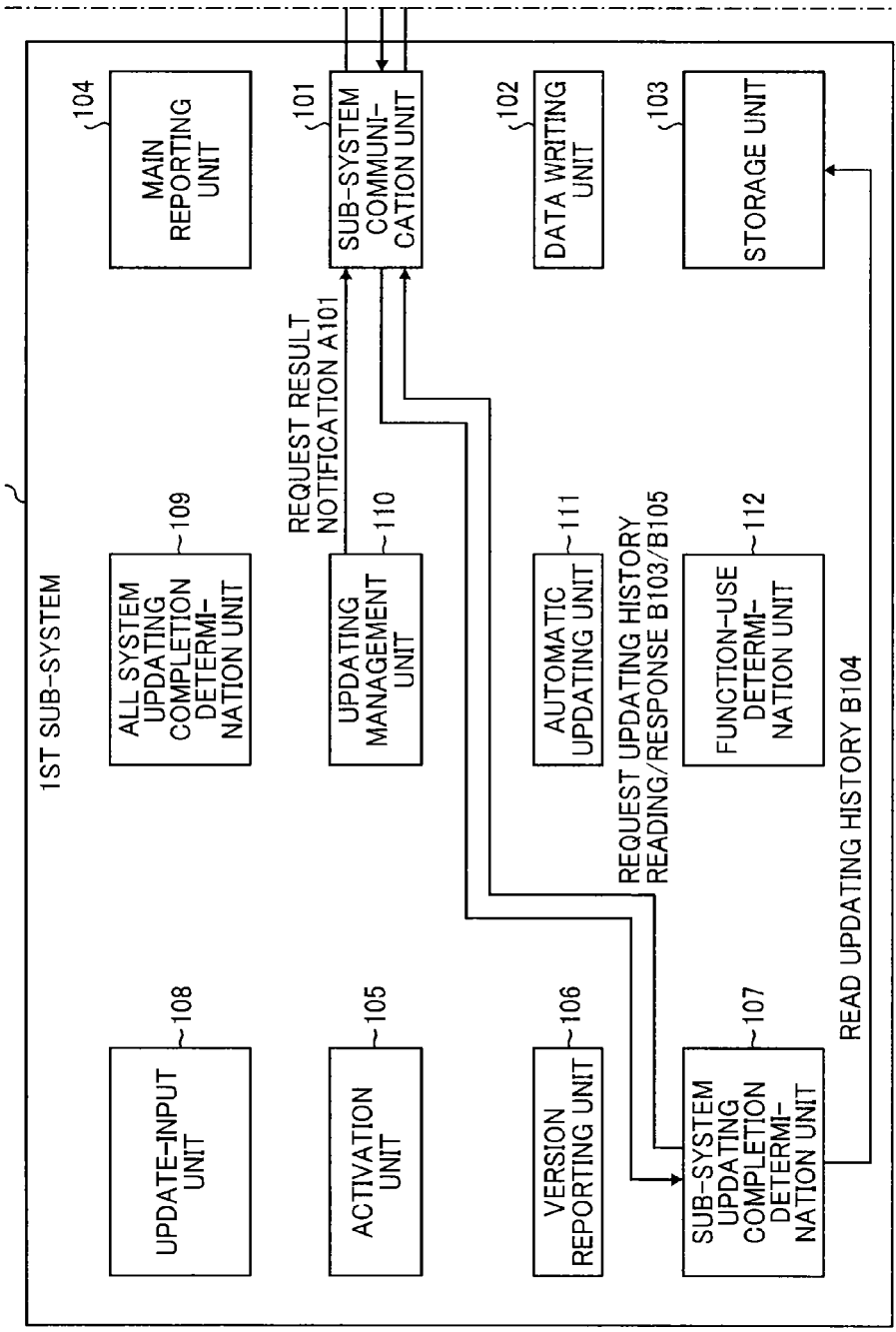

From: RicohDevice <ricohdevice@example.com>
To: DeviceAdmin <deviceadmin@example.com>
Subject: FIRMWARE UPDATE RESULT
Date: 11 Nov 2011 11:11:11 +0900

"RicohDevice" FIRMWARE UPDATE RESULT:

ENTIRE SYSTEM:
   UPDATE IS FAILED (2011/11/11 11:10:45)

SUB-SYSTEM 1
   UPDATE IS COMPLETED (2011/11/11 10:48:21)

SUB-SYSTEM 2
   UPDATE IS FAILED (2011/11/11 10:55:37)
        ↓
   UPDATE IS FAILED (2011/11/11 11:10:43)

| VERSION | UPDATED BYTE NUMBER | TOTAL BYTE NUMBER |
|---------|---------------------|-------------------|
| 2.00 | 1708342 | 2534026 |

INFORMATION PROCESSING APPARATUS, INFORMATION PROCESSING METHOD, AND INFORMATION PROCESSING PROGRAM FOR UPDATING A DATA SET

CROSS-REFERENCE TO RELATED APPLICATION

This application claims priority to Japanese Patent Application No. 2012-001417, filed on Jan. 6, 2012 in the Japan Patent Office, the disclosure of which is incorporated by reference herein in its entirety.

BACKGROUND

1. Technical Field

The present invention relates to an information processing apparatus that updates data set stored in a storage, an information processing method, and an information processing program.

2. Description of the Background Art

Data set such as firmware stored in information processing apparatuses can be updated at any time if required. Further, if one single information processing apparatus includes a plurality of systems having a plurality of central processing units (CPUs), a plurality of firmware is stored in such apparatus. In such apparatus, the plurality of firmware is batch processed for updating to efficiently update the firmware. If each firmware is updated separately, the plurality of firmware may be stored in the apparatus with an unsuitable combination status, in which the apparatus cannot be operated desirably.

JP-2011-44106-A discloses one method of updating a plurality of firmware with a batch process to reduce the time required for updating firmware, in which a version of update-use firmware, and a version of firmware stored in the information processing apparatus are compared for each firmware, and only if the update-use firmware is a new version, the updating of version of firmware is executed.

The version information of firmware can be included as a portion of firmware data. If the updating of firmware is interrupted suddenly by a power shutdown during the updating process, the updating of firmware cannot be completed correctly. However, when such interruption occurs, new version information of firmware may be already overwritten on the old version information of firmware in a memory even if the updating of firmware is not completed correctly.

After such interruption, the power may be turned ON again, and then the version of firmware is checked. However, because the new version information is already stored in the memory, it is determined that the updating of firmware is not required when the process of comparing version information is conducted, by which the updating of firmware cannot be completed correctly. Further, such problem may occur when updating data set other than firmware, and when the updating data set is only one data set.

SUMMARY

In one aspect of the present invention, an information processing apparatus is devised. The information processing apparatus including a storage unit, using a processing device, to store data set including version information of the data set; an acquiring unit, using a processing device, to acquire update-use data set including corresponding version information; a providing unit, using the processing device, to provide the version information of data set read from the storage unit; a updating management unit, using the processing device, to determine whether updating of the data set stored in the storage unit is required, wherein when the updating management unit determines that updating is required based on the version information of the update-use data set, acquired by the acquiring unit, and the version information provided by the providing unit, the updating management unit updates the data set stored in the storage unit using the update-use data set; and a updating completion determination unit, using the processing device, to determine whether the updating of data set by the updating management unit is completed, wherein when the updating completion determination unit determines that the updating of the data set is not completed correctly, the providing unit provides specific version information indicating the updating is not completed correctly to the updating management unit instead of the version information of data set stored in the storage unit.

In another aspect of the present invention, a method of managing data set used for information processing apparatus is devised. The method including the steps of 1) storing data set including version information of the data set in a storage unit; 2) acquiring update-use data set including corresponding version information; 3) providing the version information of data set read from the storage unit; 4) determining whether updating of the data set stored in the storage unit is required, wherein the determining determines that updating is required based on the version information of the acquired update-use data set and the provided version information, in which updating the data set stored in the storage unit using the update-use data set; and 5) determining whether the updating of data set is completed, wherein when determined that the updating of the data set is not completed correctly, providing specific version information indicating the updating is not completed correctly instead of the version information of data set stored in the storage unit.

In another aspect of the present invention, a non-transitory computer-readable storage medium storing a program that, when executed by a computer, causes the computer to execute a method of managing data set used for information processing apparatus is devised. The method including the steps of 1) storing data set including version information of the data set in a storage unit; 2) acquiring update-use data set including corresponding version information; 3) providing the version information of data set read from the storage unit; 4) determining whether updating of the data set stored in the storage unit is required, wherein the determining determines that updating is required based on the version information of the acquired update-use data set and the provided version information, in which updating the data set stored in the storage unit using the update-use data set; and 5) determining whether the updating of data set is completed, wherein when determined that the updating of the data set is not completed correctly, providing specific version information indicating the updating is not completed correctly instead of the version information of data set stored in the storage unit.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 shows a functional configuration of the information processing apparatus of FIG. 1;

FIG. 11 shows a sequence of a updating of firmware for a second example operation;

FIG. 20 shows a sequence of operation conducted by the information processing apparatus of FIG. 1 for a sixth example operation;

FIG. 21 shows an example of ON/OFF control of LED when updating is failed for sub-system;

Figure 1:
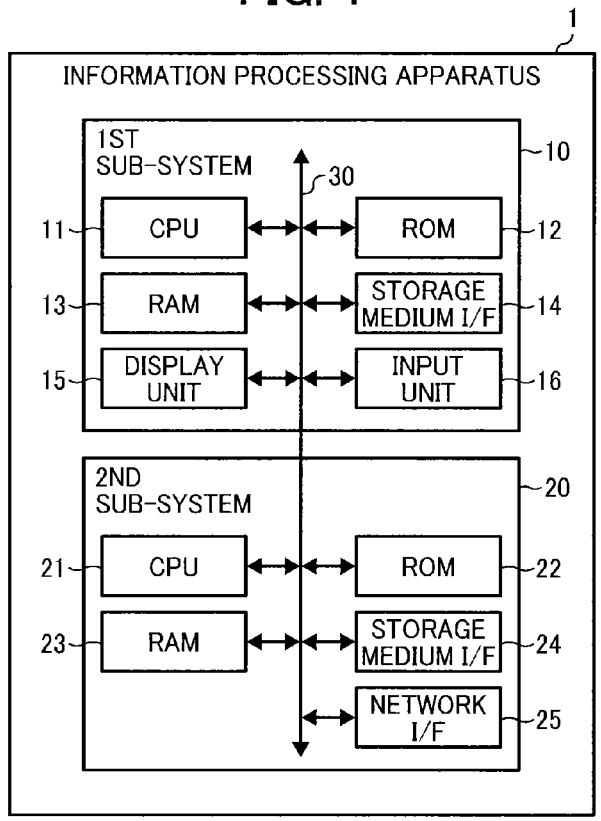
FIG. 1 shows a hardware configuration of an information processing apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

A description is now given of an information processing apparatus according to an example embodiment. FIG. 1 shows a hardware configuration of an information processing apparatus 1 according to an example embodiment. As shown in FIG. 1, the information processing apparatus 1 includes, for example, a plurality of sub-systems such as a first sub-system 10 and a second sub-system 20, and such sub-systems can be operated cooperatively. For example, the first sub-system 10 is mainly used for receiving a user input, displaying information on a screen using a display unit, and the second sub-system 20 is mainly used for communication with other devices such as external devices via a network. Further, such sub-systems and each hardware device shown in FIG. 1 can be connected with each other by a system bus 30.

The first sub-system 10 includes, for example, a central processing unit (CPU) 11, a read only memory (ROM) 12, a random access memory (RAM) 13, a storage medium interface (I/F) 14, a display unit 15, and an input unit 16.

The CPU 11 is used as a controller to control the first sub-system 10. By executing various programs stored in the ROM 12, the CPU 11 can devise functions shown in FIG. 3. Such programs include firmware that can be updated. The CPU 11 can execute some operations such as detecting operation of the input unit 16, and communication with the second sub-system 20 without using firmware. Further, the CPU 11 can execute an operation of updating of firmware to be described later. Further, in the information processing apparatus 1, the first sub-system 10 may control the information processing apparatus 1 as a whole, and the CPU 11 can be devised as a controller of the information processing apparatus 1.

The ROM 12 is a non-volatile storage medium to store programs and parameters used by the CPU 11, and a rewriteable storage medium to which programs and parameters can be rewritten. The RAM 13 is a storage medium to store data temporarily, and can be used as a working memory of the CPU 11. The storage medium I/F 14 is used as an interface of data output/input with a detachable external storage medium. For example, an interface for a universal serial bus (USB) memory, a memory card, or the like can be used.

The display unit 15 is used as a display device including a display and lamps to display messages, and graphical user interfaces (GUI) for a user, and to report apparatus operation status to a user. The input unit 16 is an operation unit that includes operators such as switches, buttons, a touch panel, by which a user inputs information.

Further, the second sub-system 20 includes, for example, a CPU 21, a ROM 22, a RAM 23, a storage medium I/F 24, and a network I/F 25. The CPU 21 can be used as a controller to control the second sub-system 20. By executing various programs stored in the ROM 22, the CPU 21 can devise functions shown in FIG. 3. Such programs include firmware that can be updated. The CPU 21 can execute some operations such as communication using a protocol via the network I/F 25, and communication with the first sub-system 10 without using firmware. Further, the CPU 21 can execute an operation of updating of firmware to be described later.

The ROM 22 is a non-volatile storage medium to store programs and parameters used by the CPU 21, and a rewriteable storage medium to which programs and parameters can be rewritten. The RAM 23 is a storage medium to store data temporarily, and used as a working memory of the CPU 21. The storage medium I/F 24 is an interface similar to the storage medium I/F 14, which may use different standard.

The network I/F 25 is an interface used as a communication unit to communicate with other devices such as external devices via a network such as local area network (LAN). The communication standard such as a protocol used for communication is not limited to any specific standard but any standard can be used in view of wired or wireless communication. Further, the network I/F 25 may be an interface for a peer to peer communication.

Such information processing apparatus 1 can communicate with other devices such as external devices based on a user operation to the input unit 16 or automatic operation. Further, the information processing apparatus 1 can be connected to a storage medium via the storage medium I/Fs 14 and 24, and can read from the storage medium and write data to the storage medium, and can display results on the display unit 15. Further, the information processing apparatus 1 can be connected to other external devices for inputting/outputting information. For example, the information processing apparatus 1 can be connected to a print engine to form images on sheets based on image data, a scanner engine to scan image data, and a projector to project images on a screen based on image data. Such inputting/outputting devices can be controlled by one of the CPUs disposed for the sub-systems.

A description is given of updating of firmware stored in the ROM 12 and/or the ROM 22 of the information processing apparatus 1. FIG. 2 schematically shows data format and updating of firmware stored in the ROM 12 and/or the ROM 22.

Figure 2A:
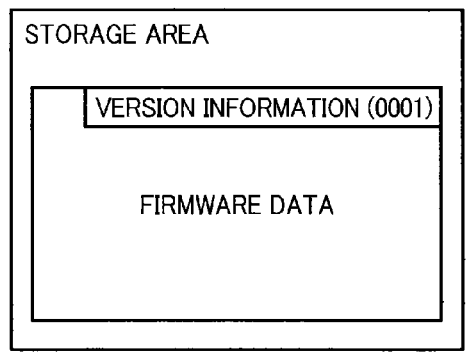
FIGS. 2A and 2B schematically show data format and updating of firmware stored in the information processing apparatus of FIG. 1.
Figure 2B:
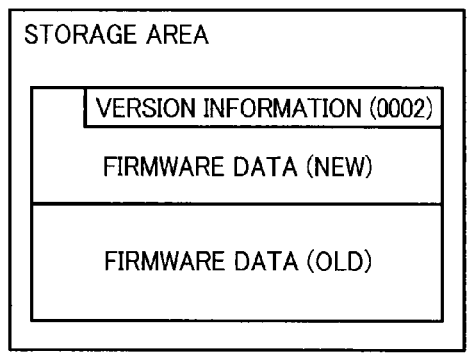

As for the information processing apparatus 1, the ROM 12 may store firmware used by the first sub-system 10, and the ROM 22 may store firmware used by the second sub-system 20. Such firmware can be stored in a storage area on the ROM 12 and 22. Further, as shown in FIG. 2A, firmware data includes data and corresponding version information indicating the version of concerned firmware. When the firmware is to be updated with a new one, as shown in FIG. 2B, for example, new data of firmware can be overwritten on the old data of firmware, and then stored. The size of old data and the size of new data are not required to be the same size, but the data size can be different with each other.

The version information of firmware is compared between the version information of already-stored firmware (or old firmware) and firmware version information included in update-use firmware (or new firmware). Based on a comparison of the version information of firmware, it is determined whether the updating of version information of firmware is required. For example, if the version information included in update-use firmware (new firmware) is a new one, the version information of firmware is updated. Further, the version information of firmware can be changed to an older version in some cases, as required.

For determining whether the updating of version information of firmware is required, it is preferable if the version information can be easily searched and read out from the firmware data. Therefore, data of the version information may be set at the beginning portion of the firmware data.

Therefore, if the updating is interrupted by sudden power shut down during the updating of firmware, as shown in FIG. 2B, new data is overwritten on the version information without completing the updating of entire firmware, in which the version information is updated to the new one, but the contents of the firmware is still old one. If the firmware version is referred under such condition, the latest stored version information is recognized as the presently stored version information of firmware, and then determines that updating is not required because the stored version information is recognized as the latest version.

In this disclosure, a module that determines whether the updating is required is described. Such module can determine whether the updating of firmware is completed correctly using version information of firmware. For example, such module can determine that the updating is not completed correctly based on specific version information indicating such uncompleted situation, wherein such specific version information can be defined with information not used for a normal operation. Therefore, even if one version information is actually stored in the storage unit such as a storage medium, it can recognize which firmware requires another updating operation again due to the interruption of updating of firmware.

Figure 4:
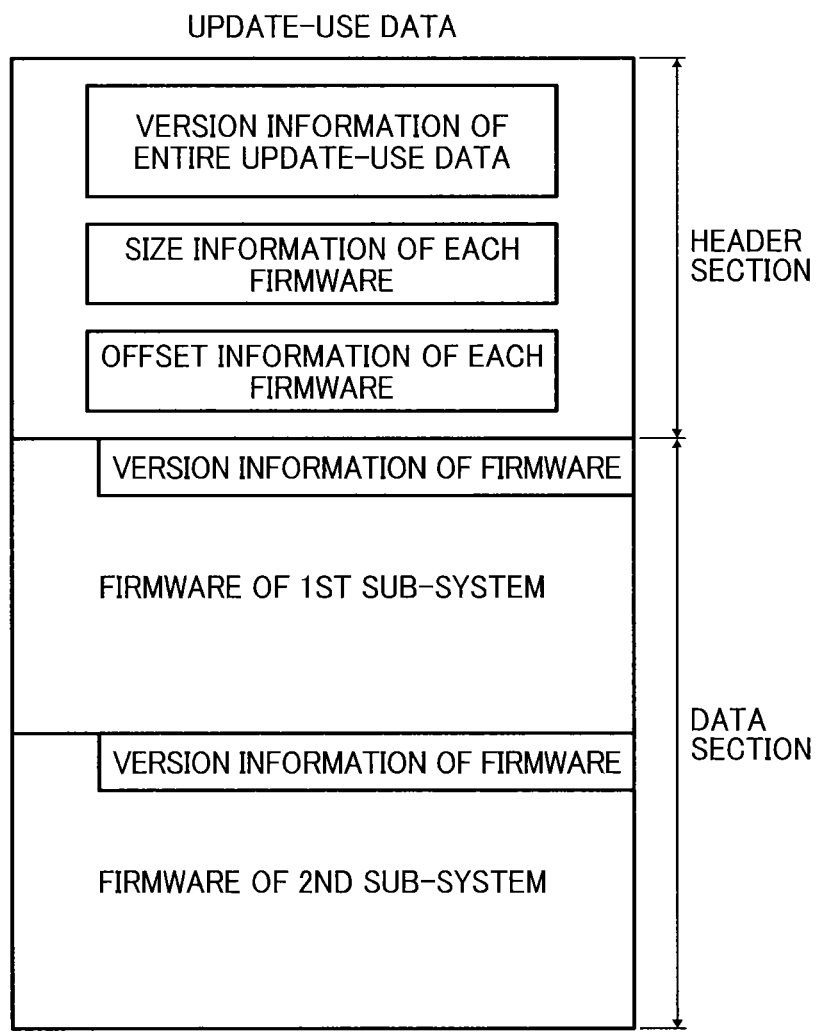
FIG. 4 shows an example configuration of update-use data used for updating of firmware.

FIG. 3 shows a functional configuration of the information processing apparatus 1 which can devise the updating operation according to an example embodiment, wherein some of the functions shown in FIG. 3 may or may not be used to conduct operations to be described with FIG. 4 and subsequent drawings.

As shown in FIG. 3, in the information processing apparatus, the first sub-system 10 includes, for example, a sub-system communication unit 101, a data writing unit 102, a storage unit 103, a main reporting unit 104, an activation unit 105, a version reporting unit 106, a sub-system updating completion determination unit 107, a update-input unit 108, an all system updating completion determination unit 109, a updating management unit 110, an automatic updating unit 111, and a function-use determination unit 112.

The second sub-system 20 includes, for example, a sub-system communication unit 201, a data writing unit 202, a storage unit 203, a network communication unit 204, an activation unit 205, a version reporting unit 206, and a sub-system updating completion determination unit 207.

Each function shown in FIG. 3 can be devised when the CPU 11 and/or the CPU 21 execute programs for controlling each unit in the information processing apparatus 1. Programs to implement such function of each unit are not target data for updating. Therefore, even if updated-firmware cannot be used by each unit, such each unit can function without any effect of firmware.

The sub-system communication unit 101 of the first sub-system 10 can be used as a communication unit that conducts data transmission between the sub-systems, and can transmit and receive various requests, various responses, and data such as update-use firmware with a sub-system communication unit of other sub-system.

The data writing unit 102 is a writing unit that can write update-use firmware to the storage unit 103.

The storage unit 103 is a storage that can store firmware executable by the CPU 11 of the first sub-system 10, and various data used for controlling the updating operation of firmware. Data stored in the storage unit 103 can be retained even when the information processing apparatus 1 is set to the power-supply OFF condition.

The main reporting unit 104 is used to report a update result of firmware to a user by controlling the display unit 15. The activation unit 105 is used to activate firmware stored in the storage unit 103, and further, the activation unit 105 can prohibit an activation of firmware, as required, which means the activation unit 105 can also function as a prohibiting unit.

The version reporting unit 106 can be used as a providing unit that provides the version information of firmware stored in the storage unit 103 to the updating management unit 110 and other units, as required. Further, in some cases, the version reporting unit 106 may not provide version information read from the storage unit 103, but provide other version information, wherein such case corresponds when the most-recent updating is failed.

The sub-system updating completion determination unit 107 can be used as a updating completion determination unit that determines whether the updating of firmware in the first sub-system 10 is completed or not. The determination process by the sub-system updating completion determination unit 107 will be described later.

The update-input unit 108 is used as an input unit that receives data related to firmware updating such as data of update-use firmware, and firmware updating instruction. In other words, the update-input unit 108 can be used an acquiring unit to acquire data such as data of update-use firmware.

The all system updating completion determination unit 109 is used as a updating completion determination unit that determines whether the updating of firmware in all sub-systems of the information processing apparatus 1 is completed or not. The determination process of the all system updating completion determination unit 109 will be described later.

The updating management unit 110 is used as a updating management unit that manages the updating operation or process of firmware of the information processing apparatus 1 entirely. The updating management unit 110 can collect information from each unit used for updating process and information from each unit used for determining whether the updating is required. Based on the collected information, the updating management unit 110 instructs the each unit to conduct an operation required for updating. The automatic updating unit 111 controls an automatic updating of firmware.

Based on the update status of firmware, the function-use determination unit 112 determines whether an operation requested to the information processing apparatus 1 can be executed. Further, if the requested operation is not executable, such operation is not executed, and the function-use determination unit 112 reports a situation that operation cannot be executed to a request issuer that has requested such operation. The requested operation may be requested by a user instruction, by other devices such as external devices using an operation instruction, and by an operation instruction generated automatically in the information processing apparatus 1. For example, when the updating of firmware is interrupted for one sub-system, the function-use determination unit 112 determines that an operation using such sub-system is not executable.

Among such units, the all system updating completion determination unit 109, the updating management unit 110, and the automatic updating unit 111 may be implemented in one of a plurality of sub-systems included in the information processing apparatus 1, and the all system updating completion determination unit 109, the updating management unit 110, and the automatic updating unit 111 can be used for updating of firmware for all sub-systems. In this disclosure, the all system updating completion determination unit 109, the updating management unit 110, and the automatic updating unit 111 are implemented in the first sub-system 10 to control the information processing apparatus 1 as a whole.

Further, other units such as the sub-system communication unit 101, the data writing unit 102, the storage unit 103, the activation unit 105, the version reporting unit 106, and the sub-system updating completion determination unit 107 may be implemented in each sub-system such as the first sub-system 10, and such units having the same function are implemented in the second sub-system 20, and such units can function in the first sub-system 10 and the second sub-system 20 with similar manner.

Other units such as the main reporting unit 104, the update-input unit 108, and the function-use determination unit 112 may be implemented in the first sub-system 10 because the first sub-system 10 may be provided with a function to control the display unit 15, a function to receive input-data for updating firmware, and a function to receive a request of operation. However, such functions can be provided in other sub-system, or distributed among a plurality of sub-systems, as required.

Further, the network communication unit 204 of the second sub-system 20 is a reporting unit that reports a update result of firmware to a user via a network. Because the second sub-system 20 is provided with a function to control the network I/F 25, the network communication unit 204 is provided to the second sub-system 20.

A description is given of operation or process conducted by such units with reference to a plurality of example operations. The operation or process are actually conducted by a hardware configuration such as a CPU, but for the sake of description, it is described that one or more units of FIG. 3 conduct the operation or process.

First Example Operation

FIGS. 4 to 10

In a first example operation of the information processing apparatus 1, upon receiving update-use data, the firmware stored in each sub-system can be updated. FIG. 4 shows an example of update-use data used for updating the firmware. As shown in FIG. 4, the update-use data includes a header section and a data section. The data section has data of firmware storable in a storage of each sub-system. Further, the data section has version information of firmware indicating a version of each firmware. Each one of firmware is one set of data used for updating, which may be referred to the update-use data set in this disclosure.

Further, the header section has information such as version information for the entire update-use data, size of each firmware, and offset information indicating position of data of each firmware in the data section. Based on such information, the updating management unit 110 (FIG. 3) can retrieve update-use firmware corresponding to each sub-system from the update-use data (FIG. 4).

Figure 5B:
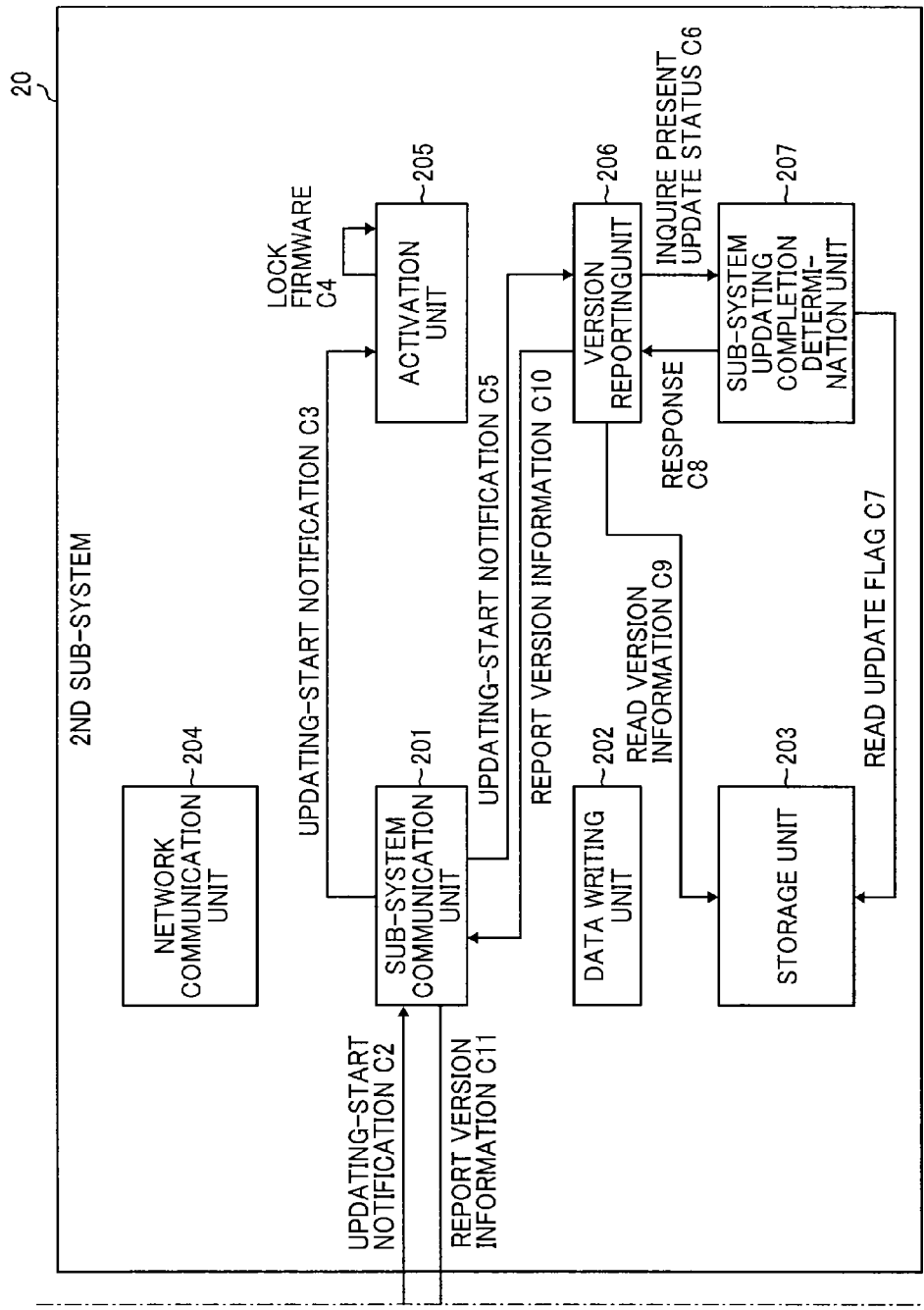
FIGS. 5A/5B and FIGS. 6A/6B show a sequence of update operation of firmware of each sub-system upon receiving update-use data at the information processing apparatus of FIG. 1, which is a first example operation.

Upon receiving the update-use data, the information processing apparatus 1 can conduct a updating operation or process of firmware for each sub-system as shown in FIGS. 5A/5B and FIGS. 6A/6B. In the following descriptions for drawings, the series of step A, and a series of step X relate to management of overall updating operation or process. The series of step B relates to a updating operation or process of firmware of the first sub-system 10. The series of step C relates to a updating operation or process of firmware of the second sub-system 20.

Further, the following drawings describe a case that the updating of firmware for both of the first sub-system 10 and the second sub-system 20 is completely conducted. If it is determined that the updating is not required at least one of the first sub-system 10 and the second sub-system 20 during the updating process, a part or whole of series of step B and C may not be executed.

A description is given with reference to FIGS. 5A/5B. As shown in FIGS. 5A/5B, when the update-use data is input to the information processing apparatus 1, the update-input unit 108 receives the update-use data (A1). The data input can be conducted by reading data from, for example, a memory such as a universal serial bus) USB memory connected to the storage medium I/F 14 of the information processing apparatus 1, which can be referred active receiving or acquiring, or by receiving data from other devices such as external devices via the network I/F 25, which can be referred passive receiving or acquiring. As such the update-input unit 108 can be used as an acquiring unit for data. When receiving data from other devices, the updating-input unit may be also provided for the second sub-system 20.

Upon receiving the update-use data, the update-input unit 108 temporarily stores the update-use data in the RAM 13, and transmits a notification of reception of update-use data, which informs the reception of the update-use data, and a request of updating (hereinafter, updating request) of firmware based on the received data to the updating management unit 110 (A2). Upon receiving such notification and request, the updating management unit 110 starts to control a updating of firmware for the first sub-system 10 and the second sub-system 20, as required.

A description is given of updating of firmware for the first sub-system 10. The updating management unit 110 transmits a updating-start notification to the activation unit 105 to inform that the updating of firmware is to be started (B1). Upon receiving such updating-start notification, the activation unit 105 locks a firmware, which is to be updated so that the to-be-updated firmware is not operated (B2), in which the activation of the target firmware is prohibited, and if the target firmware is already activated, such activation is terminated.

Further, the updating management unit 110 also transmits a updating-start notification to the version reporting unit 106 (B3). The updating-start notification is used to report that the updating of firmware is stared, and also used to demand the version information of firmware presently or currently stored in the storage unit 103 of the first sub-system 10 to determine whether the updating is required for the first sub-system 10.

Upon receiving the updating-start notification, the version reporting unit 106 inquires present or current update status of firmware in the first sub-system 10 to the sub-system updating completion determination unit 107 (B4), in which it is inquired whether the most recent updating of firmware is interrupted, or the most recent updating of firmware is correctly completed.

Upon receiving such inquiry, the sub-system updating completion determination unit 107 reads out a update flag indicating the update status from the storage unit 103 (B5). Based on the value of update flag, the sub-system updating completion determination unit 107 transmits a response indicating whether the most recent updating is interrupted or completed correctly to the version reporting unit 106 (B6). The update flag will be described later. Upon receiving the response from the sub-system updating completion determination unit 107, the version reporting unit 106 determines the version information of firmware to be reported to the updating management unit 110 based on the received response.

If the most recent updating is completed correctly, it can be assumed that the firmware presently stored in the storage unit 103 has a correct version for the concerned firmware. Therefore, the version information of firmware is read from the storage unit 103 (B7), and the read version information is reported to the updating management unit 110 (B8).

In contrast, if the most recent updating is interrupted, it can be assumed that the firmware presently stored in the storage unit 103 is not stored with correct data. However, even under such situation, the version information can be read out from the storage unit 103 as if as a correct version if accessed to the storage unit 103 because the version information can be stored as shown in FIG. 2B even if the most recent updating is interrupted. Therefore, in such a case, instead of the version information read from the storage unit 103, the version information having a value not used as normal version information is reported to the updating management unit 110 (B8) as the version information to indicate that the most recent updating is not completed correctly.

Upon receiving the version information from the version reporting unit 106, as shown in FIGS. 6A/6B, based on the received version information and the version information included in update-use firmware for the first sub-system 10, the updating management unit 110 determines whether the updating of firmware is required for the first sub-system 10, wherein the first sub-system 10 is a sub-system corresponding to a version reporting unit 106 used as the notification issuer (A21). Specifically, if the received version information is an old version and the version information included in update-use firmware is a new version, it is determined that the updating is required. In contrast, if the received version information and the version information included in update-use firmware are the same one, or if the received version information is a new version, it is determined that the updating is not required.

Further, if the received version information is a value not used as normal version information, it is determined that the updating is required. In this case, it is determined that the most recent updating is interrupted, and it is determined that the first sub-system 10 cannot be operated effectively under such interrupted condition. In such a situation, it is not required to refer to the version information actually stored in the storage unit 103, further it may be determined that it is preferable to store firmware having any version information such as old version information when the updating is interrupted, and further, it may not be required to refer to the version information included in update-use firmware.

Further, such process for determining the requirement of updating of firmware is conducted for each sub-system. As shown in FIGS. 5A/5B, upon receiving the data reception notification and the updating request, the updating management unit 110 also transmits the updating-start notification to the second sub-system 20 to instruct a locking of firmware and to obtain the version information of firmware stored in the storage unit 203.

Similar to the first sub-system 10, the updating-start notification is transmitted to the activation unit 205 and the version reporting unit 206 (C3, C5), in which the updating-start notification is transmitted from the first sub-system 10 to the second sub-system 20 via the sub-system communication unit 101 of the first sub-system 10 and the sub-system communication unit 201 of the second sub-system 20 (C1, C2).

Further, similar to the first sub-system 10, upon receiving the updating-start notification, the activation unit 205 locks a firmware to be updated (C4), and the version reporting unit 206 reports or transmits the version information to the updating management unit 110 (C10, C11, C12).

Further, similar to the first sub-system 10, the version reporting unit 206 inquires present update status of firmware to the sub-system updating completion determination unit 207 (C6), and based on the response to such inquiry (C7, C8), the version reporting unit 206 reads out the version information from the storage unit 203 (C9), and then it is determined which version information is to be transmitted, in which the read-out version information may be transmitted, or the version information indicating the updating is not completed correctly is transmitted.

As above described, based on the version information received from the version reporting units 106 and 206 and the version information included in the update-use firmware, as shown in FIGS. 6A/6B, the updating management unit 110 determines whether the updating of firmware is required for each sub-system (A21). Then, the updating of firmware is conducted as follows for a sub-system that is determined to require the updating of firmware.

As for the first sub-system 10, the updating management unit 110 transmits the updating request to the data writing unit 102 to request the updating of firmware stored in the storage unit 103 using the update-use firmware included in the received update-use data (B21).

Upon receiving the updating request, the data writing unit 102 reads out data of update-use firmware for the first sub-system 10 from the update-use data temporarily stored in the RAM 13, and writes the data of update-use firmware in given area of the storage unit 103 that stores firmware (B22). Such data writing is conducted by, for example, overwriting the firmware stored in the storage unit 103 with a new firmware, and when the data writing is completed or failed, the updating management unit 110 reports such update result to the updating management unit 110 (B23), by which the updating process for the first sub-system 10 completes. If the data writing is failed, the updating process is not completed.

The updating process of the second sub-system 20 is conducted similar to the first sub-system 10. As shown in FIGS. 6A/6B, the updating management unit 110 transmits the updating request to the data writing unit 202 via the sub-system communication units 101 and 201 (C21, C22, C23). Upon receiving the updating request, the data writing unit 202 obtains data of firmware for the second sub-system 20, included in the update-use data temporarily stored in the RAM 13, by communicating with the first sub-system 10, and then writes the data of firmware for the second sub-system 20 in a given area in the storage unit 203 that stores firmware (C24). Then, the data writing unit 202 reports a update result to the updating management unit 110 (C25, C26, C27).

In a case of FIGS. 6A/6B, the updating process of the first sub-system 10 and the updating process of the second sub-system 20 are both conducted. However, one of the updating processes or both of the updating processes may not be required in some cases. Based on the update result transmitted from the data writing unit of each sub-system, the updating management unit 110 can confirm the completion of the updating process for all sub-systems (A22), and then the updating of firmware ends. Afterwards, the sub system can be reactivated as required. Further, if the writing failure is reported, the updating process can be retried for a concerned sub-system such as updating-failed sub-system.

As above described, in the information processing apparatus 1, the version information of firmware already stored in a storage is read, and then compared with the version information included in update-use firmware to determine whether the updating is required. Further, even if the most recent updating is interrupted, such interruption can be identified by conducting the process of determining the requirement of updating the firmware by the updating management unit 110, and then it can be determined that the updating is required, and then the updating process is conducted.

Further, a description is given of processes conducted at each unit shown in FIGS. 5A/5B and FIGS. 6A/6B. In the following description for the flowcharts, if the same or similar process is conducted for both of the first sub-system 10 and the second sub-system 20, the process conducted for the first sub-system 10 is described as representatives.

Figure 7:
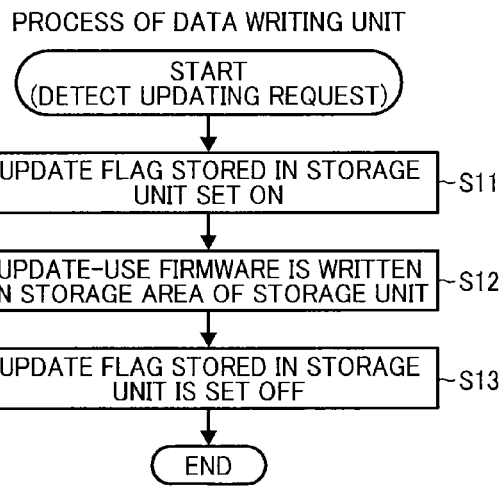
FIG. 7 shows a flowchart of a process of writing update-use firmware conducted by a data writing unit for the first example operation.

FIG. 7 shows a flowchart of steps of process of writing update-use firmware (B22) conducted by the data writing unit 102. When detecting the updating request transmitted at step B21 (FIGS. 6A/6B), the data writing unit 102 starts a process shown in FIG. 7. At first, the update flag stored in the storage unit 103 is set ON (S11), wherein the update flag may be stored in an area different from a storage area of firmware. Then, data of update-use firmware is written in a given storage area of the storage unit 103 (S12). Upon completing the data writing, the update flag stored in the storage unit 103 is set OFF (S13), and then the writing process ends.

If the updating or writing of firmware is completed correctly, the update flag can be set and maintained OFF. However, if the writing process is interrupted during the writing process (i.e., step S12) due to a sudden power shutdown of the information processing apparatus 1 or an occurrence of error, the value of update flag is being remained ON. Such ON status can be maintained even if the information processing apparatus 1 is reactivated thereafter. Therefore, by referring the value of update flag, the sub-system updating completion determination unit 107 can determine whether the most recent updating of firmware is completed correctly or interrupted.

Figure 8:
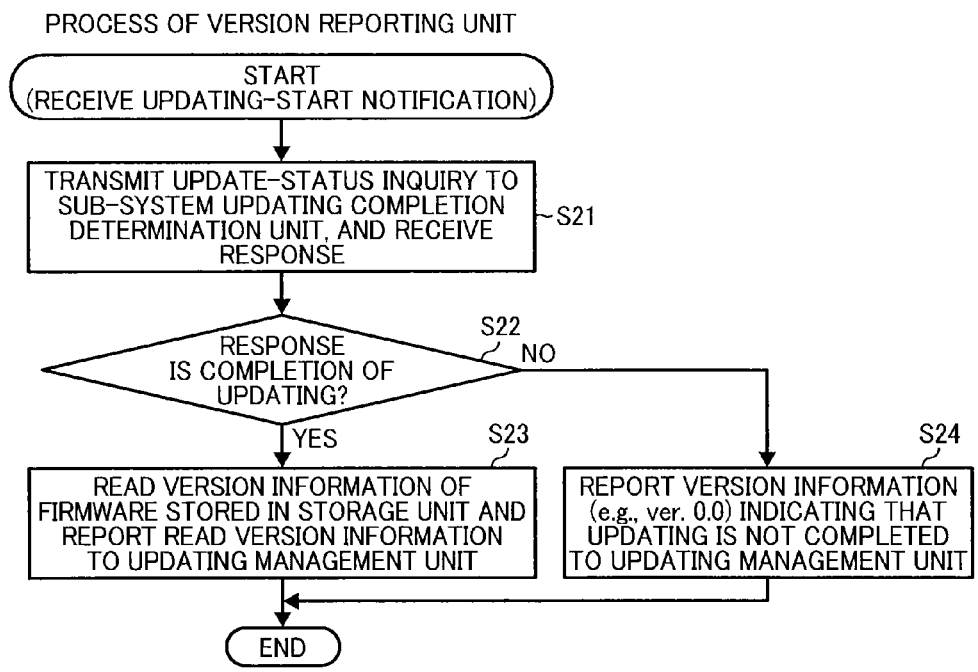
FIG. 8 shows a flowchart of a process conducted by a version reporting unit upon receiving updating-start notification for the first example operation.

FIG. 8 shows a flowchart of steps of process by the version reporting unit 106 upon receiving the updating-start notification. Upon receiving the updating-start notification transmitted at step B3 (FIGS. 5A/5B), the version reporting unit 106 starts a process shown in FIG. 8.

At first, the version reporting unit 106 transmits a update-status inquiry to the sub-system updating completion determination unit 107, and receives a response (S21: B4 and B6 in FIGS. 5A/5B). The version reporting unit 106 determines whether the received response is "completion of updating." If the response is the completion of updating (S22: YES), the version reporting unit 106 reads out the version information of firmware stored in the storage unit 103 and reports the read version information to the updating management unit 110 (S23: B7 and B8 in FIGS. 5A/5B), and then the process ends. If the response is the incompletion of updating (S22: NO), the version reporting unit 106 reports the version information indicating that the updating is not completed correctly to the updating management unit 110 (S24: B8 in FIGS. 5A/5B), and then the process ends.

Figure 9:
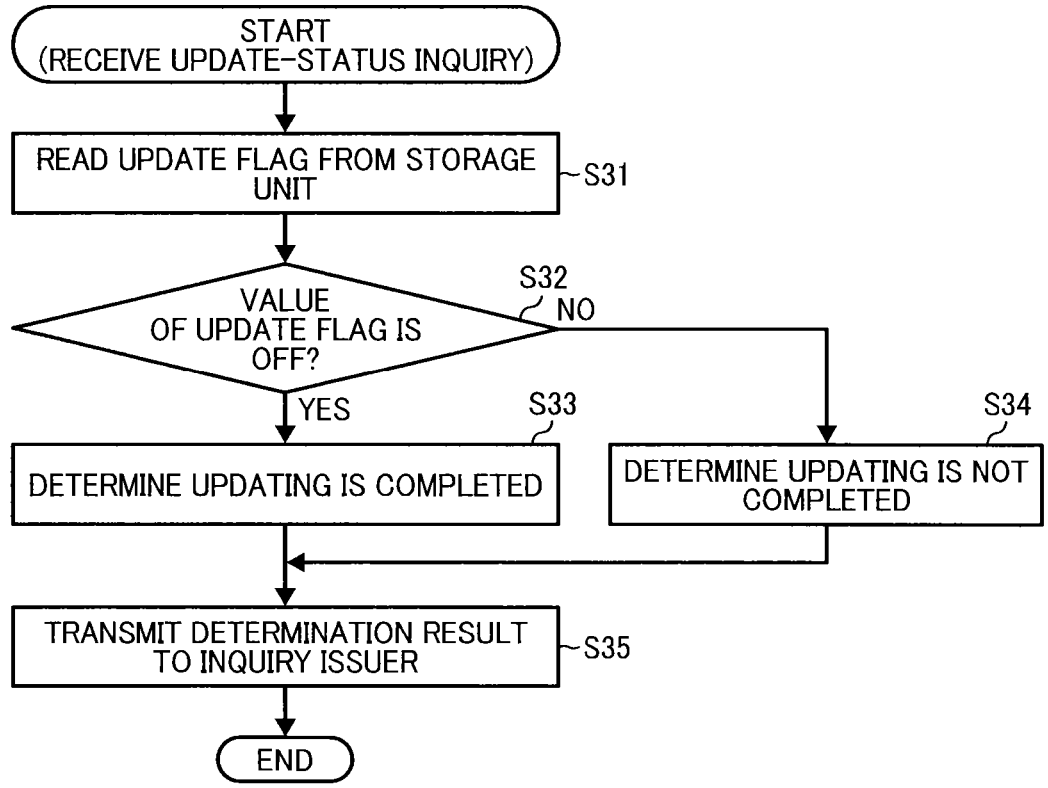
FIG. 9 shows a flowchart of a process conducted by a sub-system updating completion determination unit upon receiving a update-status inquiry for the first example operation.

FIG. 9 shows a flowchart of steps of process by the sub-system updating completion determination unit 107 upon receiving a update-status inquiry. Upon receiving the update-status inquiry transmitted at step B4 in FIGS. 5A/5B, the sub-system updating completion determination unit 107 starts the process shown in FIG. 9.

At first, the sub-system updating completion determination unit 107 reads out the update flag from the storage unit 103 (S31: B5 in FIGS. 5A/5B). If the value of read update flag is OFF, it is determined that the updating of firmware stored in the storage unit 103 is completed. Then, the sub-system updating completion determination unit 107 transmits the determination result to the version reporting unit 106, which is an inquiry issuer, as a response (S35: B6 in FIGS. 5A/5B), then the process ends.

If the value of read update flag is ON, it is determined that the updating of firmware stored in the storage unit 103 is interrupted or not completed (S32 to S34). Then, the sub-system updating completion determination unit 107 transmits the determination result to the version reporting unit 106, which is the inquiry issuer, as a response (S35: B6 in FIGS. 5A/5B), then the process ends.

By conducting the above process using the version reporting unit 106 and the sub-system updating completion determination unit 107, the version information such as old and new version information used for conducting the process of determining the requirement of updating firmware can be provided to the updating management unit 110. Further, if the most recent updating is interrupted, information indicating such interruption can be provided to the updating management unit 110 with a similar manner.

Figure 10:
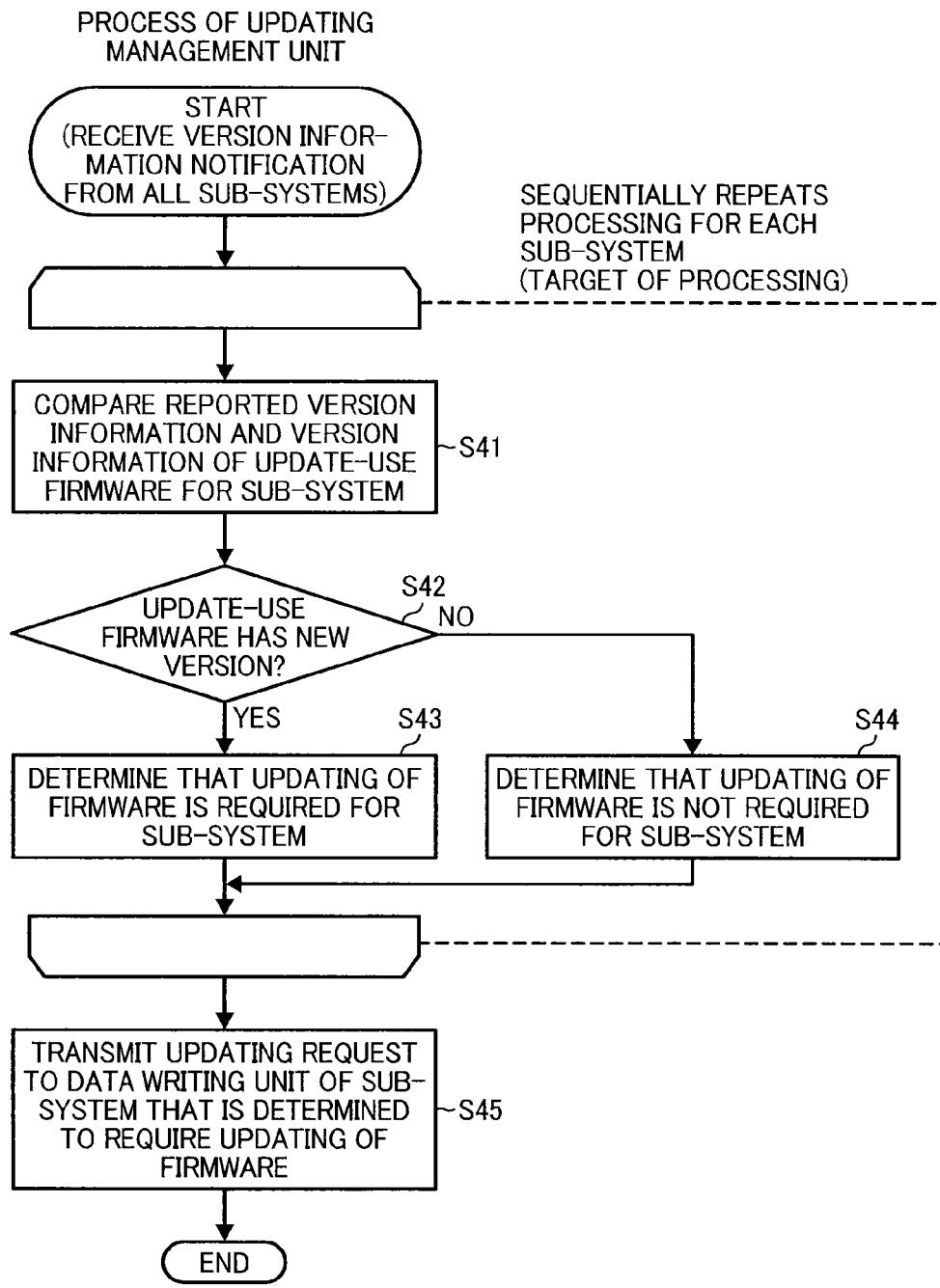
FIG. 10 shows a flowchart of a process conducted by a updating management unit upon receiving version information notification.

FIG. 10 shows a flowchart of steps of a process by the updating management unit 110 upon receiving the version information notification. Upon receiving the version information notification from the version reporting unit of all sub-systems at steps B8 and C12 in FIGS. 5A/5B, the updating management unit 110 starts the process of FIG. 10. The updating management unit 110 repeats steps S41 to S44 for each sub-system sequentially.

As for a target sub-system, which is to be processed, the version information reported from the version reporting unit, and the version information included in update-use firmware included in the update-use data received by the update-input unit 108 are compared (S41).

If the update-use firmware has a new version (S42: YES), it is determined that the updating of firmware is required for the target sub-system (S43). If the reported version information has a new version or if the compared two version information have the same information (S42: NO), it is determined that the updating of firmware is not required for the target sub-system (S44).

If the reported version information is the version information indicating the updating is not completed correctly, it can be determined that the updating of firmware is required for the target sub-system without referring the version information included in update-use firmware.

If the version information indicating that the updating is not completed correctly is set to a value such as "Ver. 0.0" which is not used as normal version information, the determination result of step S42 becomes YES regardless of the version information included in update-use firmware, and thereby a specific step to determine whether the version information indicates the not-correctly-completed updating is not required. Further, other values can be set for the version information indicating the updating is not completed correctly, and a specific step to determine such value can be provided.

Further, upon completing steps S41 to S44 for all sub-systems, the updating management unit 110 can determine whether one or more of the sub-systems require the updating process. In such a case, the updating management unit 110 transmits the updating request to the data writing unit of the one or more of the sub-systems that require the process for updating the firmware (S45: B21, C21 to C23 in FIGS. 6A/6B), and then the process ends.

By conducting the above described process by the updating management unit 110 in view of old and new version information of firmware, and interruption/non-interruption status of updating, it can effectively determine whether the updating of firmware is required for each sub-system by referring only the version information. Therefore, even if the updating of firmware is interrupted and then the reactivation is conducted, further, even if the version information of firmware in the storage unit 103 is already updated, by detecting the interruption of updating effectively, the updating of firmware can be retried again. Further, without changing a configuration of the updating management unit 110 that determines the requirement of updating process in view of only version status such as old and new version, or by changing a configuration of the updating management unit 110 a little, it can determine whether the updating is interrupted or not.

Second Example Operation

FIGS. 11, 12, 13A/13B

A description is given of a second example operation of the information processing apparatus 1, in which it can detect that the most recent updating of firmware is not conducted properly when the information processing apparatus 1 is activated such as when powering the apparatus and/or reactivating the apparatus after reset, in which a recovery mode is used for activation of the apparatus. The updating of firmware is conducted for the second example operation similar to the first example operation. However, before starting the updating and after completing the updating, a flag indicating the update status is written to the storage unit 103.

FIG. 11 shows a sequence of the updating of firmware in the second example operation. Upon receiving the updating request (S51), the updating management unit 110 conducts the updating of firmware (S54) described with reference to FIGS. 5A/5B and FIGS. 6A/6B. Before step S54, the updating management unit 110 transmits a update status notification to the all system updating completion determination unit 109 to inform the start of updating (S52). Upon receiving the notification, the all system updating completion determination unit 109 accesses the storage unit 103 to set an entire update status flag ON (S53). With such configuration, it can record that the updating of firmware is in progress in the information processing apparatus 1.

Further, upon completing the updating of firmware, the updating management unit 110 transmits the update status notification, which reports the completion of the updating process, to the all system updating completion determination unit 109 (S55). Upon receiving the update status notification, the all system updating completion determination unit 109 accesses the storage unit 103, and set the entire update status flag OFF (S56). With such processing, the information processing apparatus 1 can record that the updating of firmware is completed correctly.

In the second example operation, by conducting the process shown in FIG. 11, if the updating process is interrupted during the updating process due to a sudden power shutdown of the information processing apparatus 1 or an occurrence of error, the value of the entire update status flag is being remained ON. Such ON status can be maintained even if the information processing apparatus 1 is reactivated thereafter. Therefore, by referring that the value of the entire update status flag is ON, the information processing apparatus 1 can determine that the most recent updating of firmware is not completed correctly as similar to the update flag of the first example operation. Further, similar to the update flag of the first example operation, the entire update status flag may be stored in an area other then a storage area of firmware.

Figure 12B:
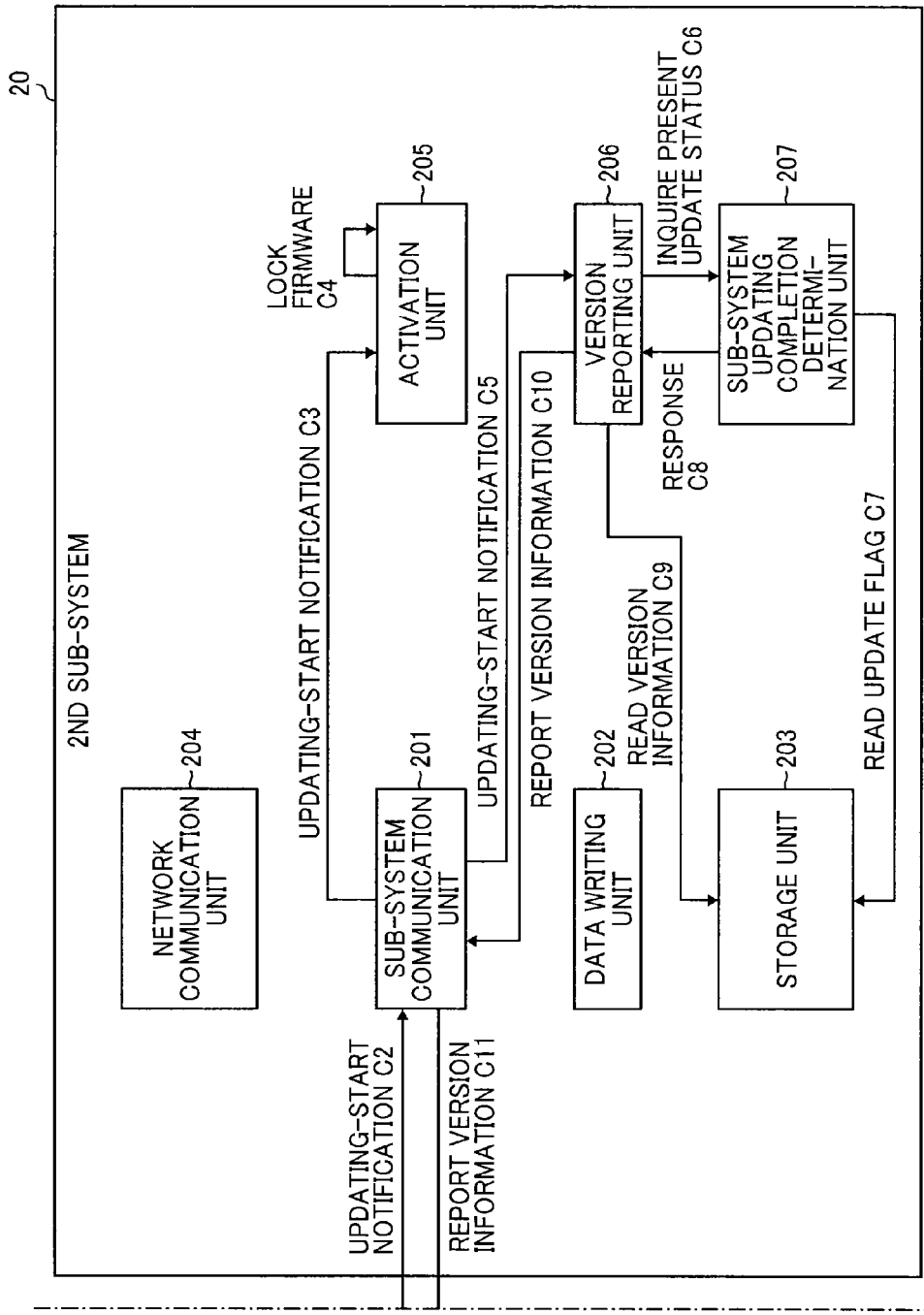
FIGS. 12A/12B show a sequence of operation conducted by the information processing apparatus of FIG. 1 for the second example operation when information processing apparatus is activated.

FIGS. 12A/12B shows a process of an operation conducted by the information processing apparatus 1 when the information processing apparatus 1 is activated in the second example operation. In FIGS. 12A/12B, the updating management unit 110 inquires the status of updating of firmware for the entire apparatus to the all system updating completion determination unit 109 (X1).

Upon receiving the inquiry, the all system updating completion determination unit 109 reads out the value of the entire update status flag, set in the process of FIG. 11, from the storage unit 103. Based on the read value of the entire update status flag, the all system updating completion determination unit 109 determines whether the updating of firmware is completed correctly or not for the information processing apparatus 1 (X2). Then, the all system updating completion determination unit 109 returns a response to the updating management unit 110 (X3).

If the response of step X3 is that the updating process is completed correctly, the updating management unit 110 does not conduct further processing. In this case, a normal activation process is conducted. Specifically, the activation units 105 and 205 of each sub-system respectively activate the firmware stored in the storage units 103 and 203 to shift the information processing apparatus 1 to a normal operation condition.

However, if the response of step X3 indicates that the updating process is interrupted and the information processing apparatus 1 is activated under such condition, it can be detected soon that the updating of firmware is at an abnormal condition such as not completing the updating at least at one of sub-systems. Therefore, the updating management unit 110 transmits the updating-start notification to the activation units 105 and 205 of each sub-system to lock the firmware (B1, B2, C1, C2, C3, C4). Because the purpose of not activating the firmware is same as the locking step shown in FIGS. 5A/5B, the same command may be used to instruct the locking of firmware so that the size or complexity of software can be reduced.

With such processing, when the information processing apparatus 1 is activated, the updating management unit 110 can automatically confirm the update status of firmware such as completion or failure of updating. If it is determined that the updating is not completed correctly, the operation of all firmware, which may be the updating target firmware, can be prohibited. Therefore, the firmware is not operated under abnormal condition such as updating is interrupted, by which the abnormal operation by the sub-system can be prevented.

Such activation of information processing apparatus 1 is called as a recovery mode, in which functions of firmware of FIG. 3 not related to the updating target firmware can be used, but other functions cannot be used.

Further, if it is to be determined which sub-system is in the updating-interrupted condition, the version information of firmware is obtained by conducting steps similar to steps B3 to B8 of FIGS. 5A/5B. The version reporting unit of the sub-system that the updating is interrupted reports the version information indicating the interruption. Further, even in the recovery mode, if the update-input unit 108 receives the update-use data, the updating of firmware can be conducted similar to the case of FIGS. 5A/5B and FIGS. 6A/6B.

Figure 13B:
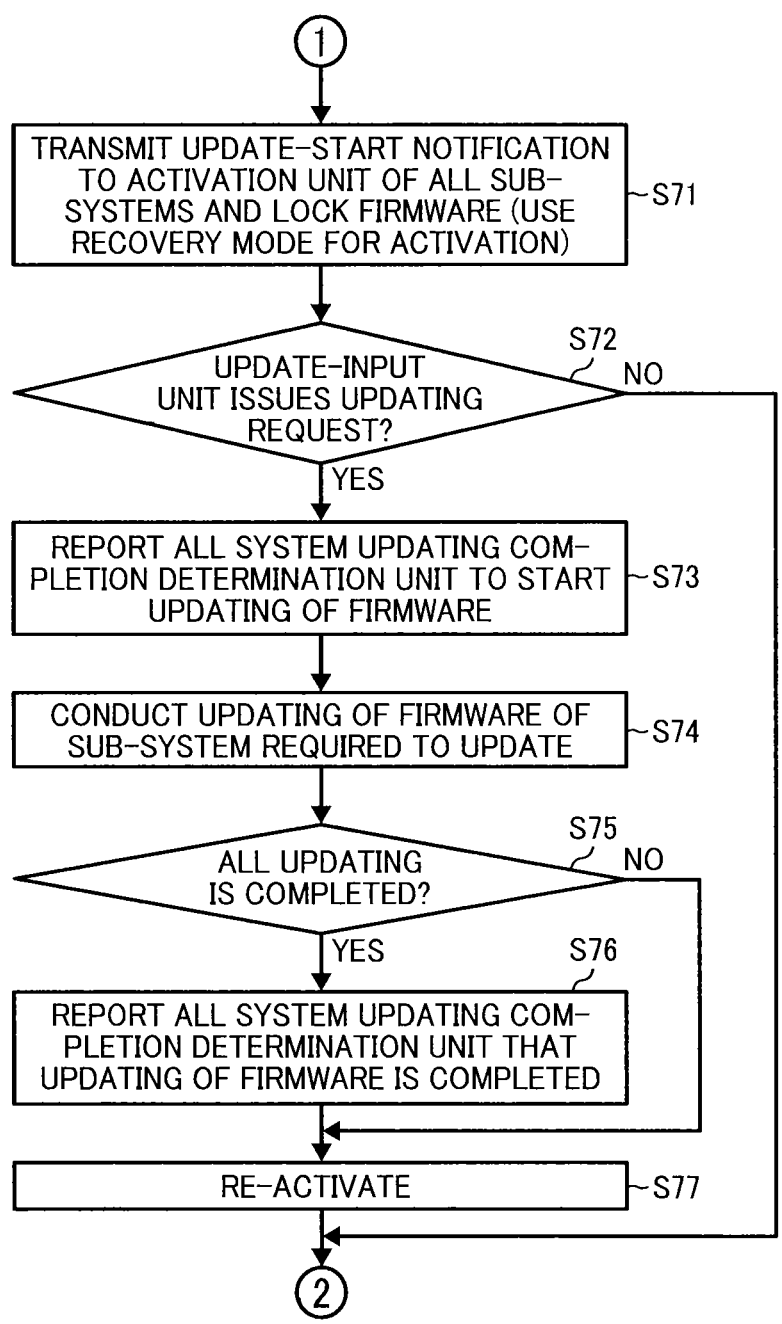
FIGS. 13A/13B show a flowchart of a process conducted by a updating management unit for the second example operation when information processing apparatus is activated.

FIGS. 13A/13B shows a flowchart of steps of process by the updating management unit 110 when the information processing apparatus 1 is activated in the second example operation. Upon detecting a given trigger event during the activation of the information processing apparatus 1, the updating management unit 110 starts the process of FIGS. 13A/13B.

At first, the updating management unit 110 inquires the update status of firmware for the entire apparatus to the all system updating completion determination unit 109, and receives a response (S61: X1 to X3 in FIGS. 12A/12B). Based on the response, the updating management unit 110 determines whether the updating of firmware is completed for the formation processing apparatus 1 entirely (S62).

If the updating of firmware is completed (S62: YES), the updating management unit 110 determines whether the updating request is received from the update-input unit 108 (S63). Such updating request is transmitted from the update-input unit 108, for example, at step A2 in FIGS. 5A/5B. If the update-input unit 108 is configured to automatically read update-use data when a USB memory storing the update-use data is connected to the storage medium I/F 14, the transmission at step A2 may be conducted during the activation of the information processing apparatus 1.

If step S63 is YES, the updating management unit 110 reports a start of the updating of firmware to the all system updating completion determination unit 109 (S64: S52 in FIG. 11) to update firmware of each sub-system (S65, S66: S54 in FIG. 11) similar to the first example operation.

If the all updating processes is completed (S67: YES), the updating management unit 110 reports the all system updating completion determination unit 109 that the updating of firmware is completed (S68: S55 in FIG. 11), and reactivates the information processing apparatus 1 (S69), then the process ends.

If the updating of firmware is not completed correctly (S67: NO) due to some reasons, the reactivation is conducted (S69) without conducting step S68. Further, instead of the reactivation, the error notification can be issued, in which the entire update status flag is remained ON because the updating is not completed correctly.

In contrast, if the updating request is not received (S63: NO), the updating of firmware is not required, and the information processing apparatus 1 is normally activated (S70). In this case, the firmware of each sub-system is activated, as required, to activate functions of firmware of each sub-system other than updating function. Further, even when the information processing apparatus 1 is normally activated, the updating of firmware according to the first example operation can be conducted based on a firmware updating command.

Further, if the updating is not completed correctly (S62: NO), the updating-start notification is transmitted to the activation units (105, 205) of all sub-systems to lock the firmware (S71: B1 to B2, C1 to C4 in FIGS. 12A/12B). With such processing, the information processing apparatus 1 is activated by the recovery mode not executing the firmware. Further, the version information of firmware can be collected from each sub-system at this timing as described with reference to FIGS. 12A/12B.

After step S71, the updating management unit 110 determines whether the updating request is received from the update-input unit 108 (S72). Such updating request is transmitted from the update-input unit 108, for example, at step A2 of FIGS. 5A/5B. The update-input unit 108 can transmit the updating request by a user updating operation such as a manual operation, and can also transmit the updating request by automatically reading the update-use data.

As such, upon receiving the updating request (S72: YES), the updating management unit 110 reports the update status to the all system updating completion determination unit 109 (S73, S75, S76), conducts the updating process (S74), and the reactivation (S77). Such processing are the same as steps S64 to S69 except not conducting the firmware locking because the firmware locking is already conducted.

If the updating request is not received (S72: NO), the process ends.

By conducting such processing, if the updating of firmware is not completed correctly for the entire information processing apparatus 1 when the information processing apparatus 1 is activated, the use of firmware of all sub-systems can be prohibited, by which the abnormal operation of firmware can be prevented and the abnormal operation of the information processing apparatus 1 can be prevented. Further, even under such condition, the updating of firmware can be retried to return the information processing apparatus 1 to a normal status.

Third Example Operation

FIGS. 14A/14B

Figure 14A:
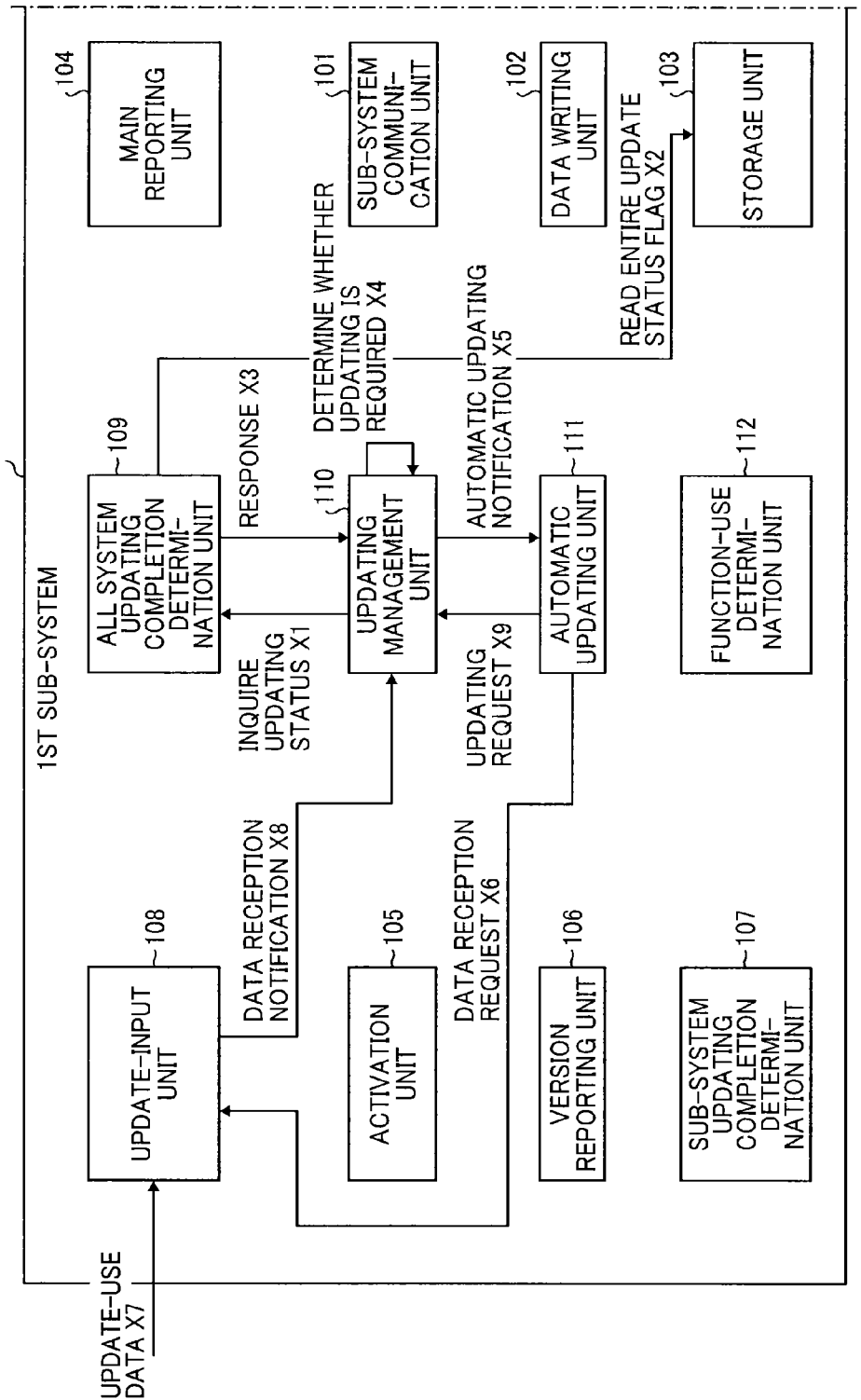
FIGS. 14A/14B show a sequence of operation conducted by the information processing apparatus of FIG. 1 for a third example operation when information processing apparatus is activated.
Figure 14B:
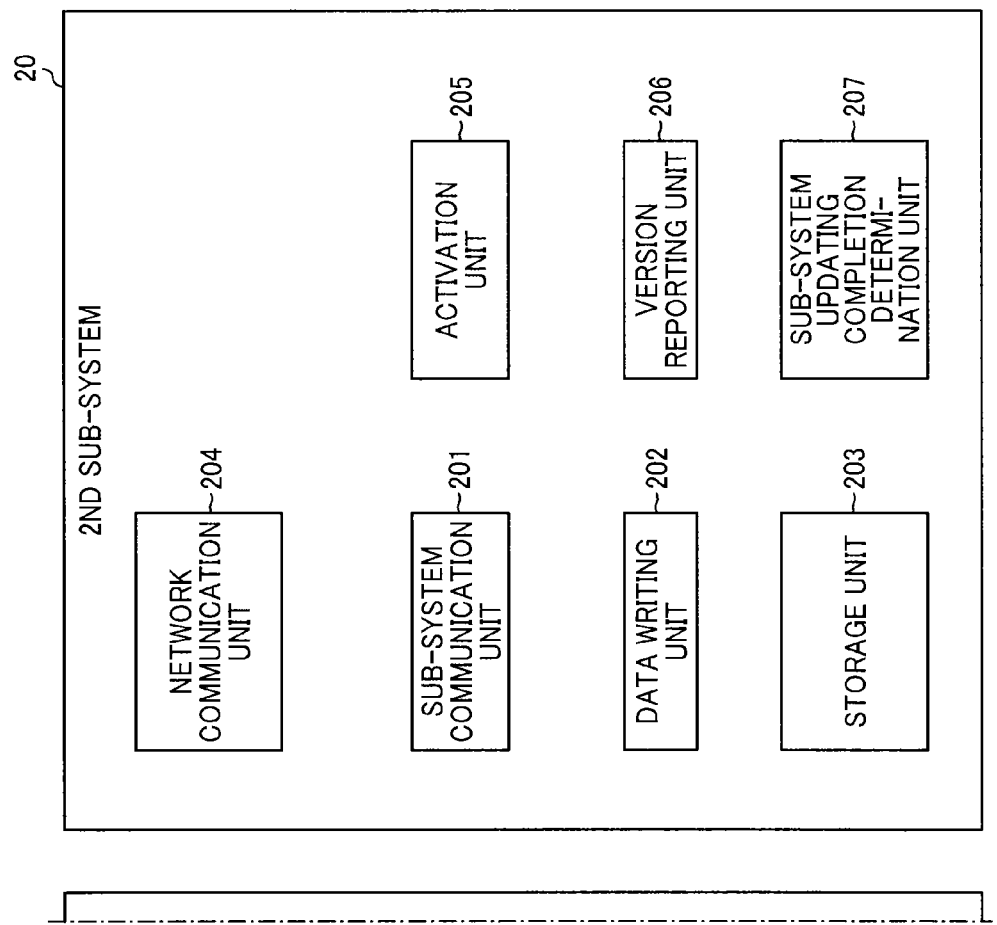

A description is given of a third example operation of the information processing apparatus 1, in which it can detect that the most recent updating of firmware is not conducted properly when the information processing apparatus 1 is activated such as when powering the apparatus, and then the updating of firmware is automatically retried, which may be referred to a retry operation. FIGS. 14A/14B shows steps of process of the third example operation when the information processing apparatus 1 is activated.

Similar to the second example operation, the value of the entire update status flag is managed for the third example operation. In a case of FIGS. 14A/14B, the updating management unit 110 inquires the update status of firmware for the entire apparatus to the all system updating completion determination unit 109, and receives a response (X1 to X3) similar to the second example operation.

Based on the response (X3), the updating management unit 110 determines whether the updating of firmware is required (X4). In this case, if the updating of firmware is not completed correctly, it is determined that the updating is required, and the updating management unit 110 transmits an automatic updating notification to the automatic updating unit 111 (X5) to instruct an execution of automatic updating.

Upon receiving the automatic updating notification, the automatic updating unit 111 transmits a data reception request to the update-input unit 108 to instruct a start of receiving update-use data (X6).

Upon receiving the data reception request, the update-input unit 108 receives the update-use data (X7). For example, if a USB memory storing the update-use data is connected to the storage medium I/F 14, the update-input unit 108 reads out the update-use data from the USB memory and temporarily stores the update-use data in the RAM 13. Upon completing the data reception, the update-input unit 108 transmits a data reception notification to the updating management unit 110 (X8).

Further, in addition to the data reception request, the automatic updating unit 111 transmits the updating request to the updating management unit 110 (X9). Upon receiving both of the data reception notification (X8) and the updating request (X9), the updating management unit 110 conducts the updating of firmware similar to the second example operation.

Further, if it is determined that the updating is required at step X4, the locking of firmware may be conducted. In this case, the updating management unit 110 conducts a process flow almost similar to the process flow of FIGS. 13A/13B by modifying the process as follows: before conducting step S72, the automatic updating notification is transmitted to the automatic updating unit 111, and the determination of step S72 becomes YES when both of the data reception notification (step X8) and the updating request (step X9) are received.

By conducting the above-described operation when the information processing apparatus 1 is activated, even if it is determined that the updating of firmware is not completed correctly for the entire apparatus, the automatic updating can be retried. Therefore, even if the updating of firmware is failed, the information processing apparatus 1 can be returned to a normal status without a user operation such as manual operation.

However, if the retry operation is being conducted over and over again and still the updating of firmware fails continuously, such retry operation may be conducted unlimited numbers of time, and such situation may hinder conducting another counter-measure for updating of firmware.

In view of such situation, a counter to count the numbers of retry operation can be provided to the automatic updating unit 111. For example, it can be devised to stop the retry operation when the counter counts the numbers of retry operation for a given number or more in a given time duration. In this case, the data reception request is not transmitted to the update-input unit 108, and the stop of updating retry operation is reported to the updating management unit 110. Further, in this case, the updating management unit 110 can activate the information processing apparatus 1 with the recovery mode to set a stand-by mode for the information processing apparatus 1.

Further, the stop of retry operation can be instructed by a user. In this case, for example, when the user instructs the stop of retry operation, the automatic updating unit 111 writes a flag indicating that the retry operation is not to be conducted when the apparatus is activated next time, in the storage unit 103. Then, when the apparatus is activated, the value of flag is checked to determine whether the retry operation can be conducted or not.

Further, if the update-input unit 108 cannot read the update-use data matched to the data reception request, such situation can be reported to the automatic updating unit 111. In this case, the automatic updating unit 111 reports the stop of the retry operation for updating to the updating management unit 110, and the information processing apparatus 1 is activated with the recovery mode to set a stand-by mode.

Further, the apparatus can be provided with a plurality of updating-input units. For example, in addition to the update-input unit 108, the second sub-system 20 can be provided with an updating-input unit to receive the update-use data via the network I/F 25, in which if the update-use data cannot be received by one updating-input unit, the automatic updating unit 111 can transmit the data reception request to another updating-input unit for the reception of the update-use data.

As such, if the automatic updating unit 111 manages the update-use data receiving process, the update-use data can be received by only one of the plurality of updating-input units, in which the update-use data is not received by two or more updating-input units, and thereby the reception of one single update-use data by the two or more updating-input units can be prevented.

Fourth Example Operation

FIGS. 15A/15B, 18

Figure 15A:
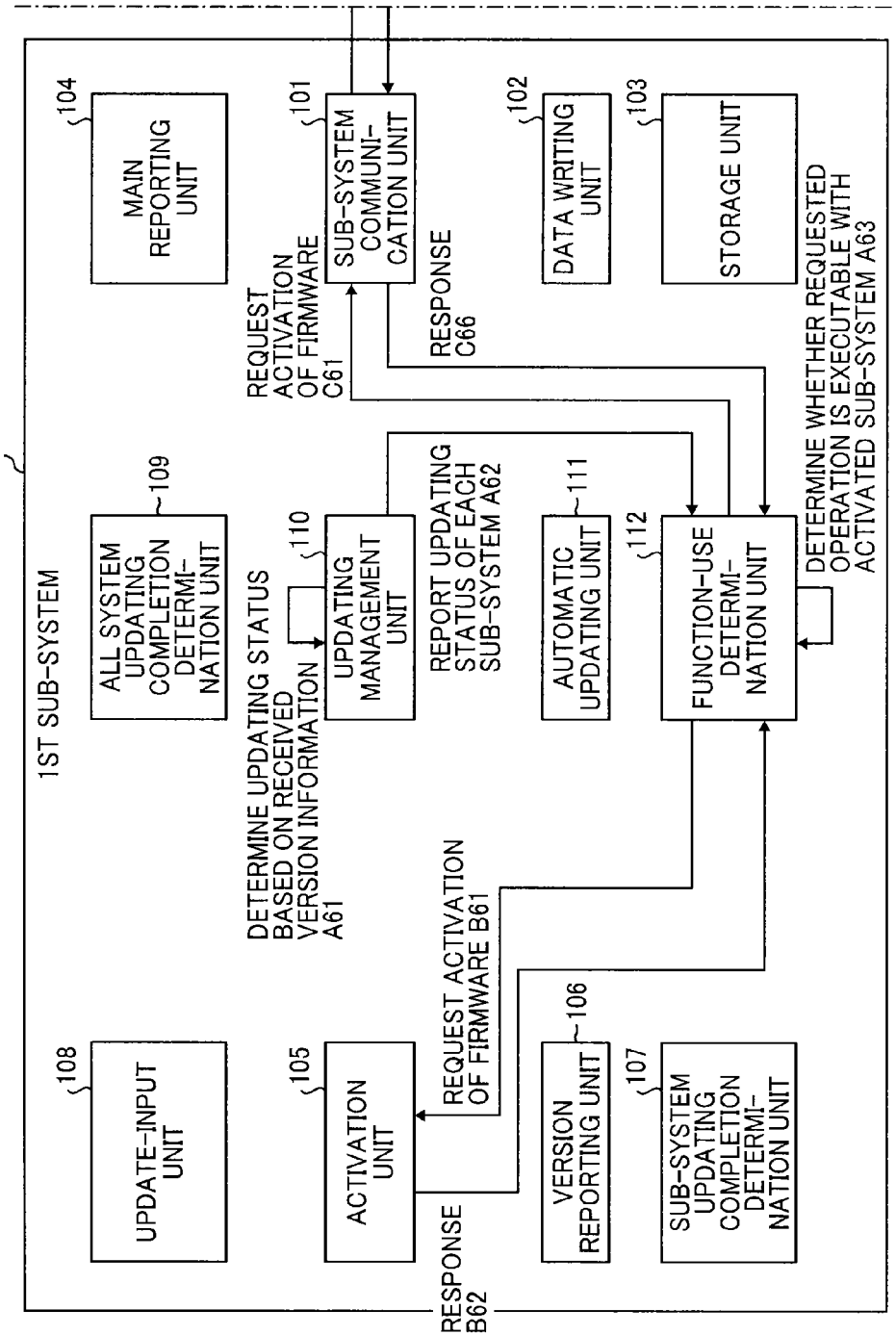
FIGS. 15A/15B show a sequence of operation conducted by the information processing apparatus of FIG. 1 for a fourth example operation.
Figure 15B:
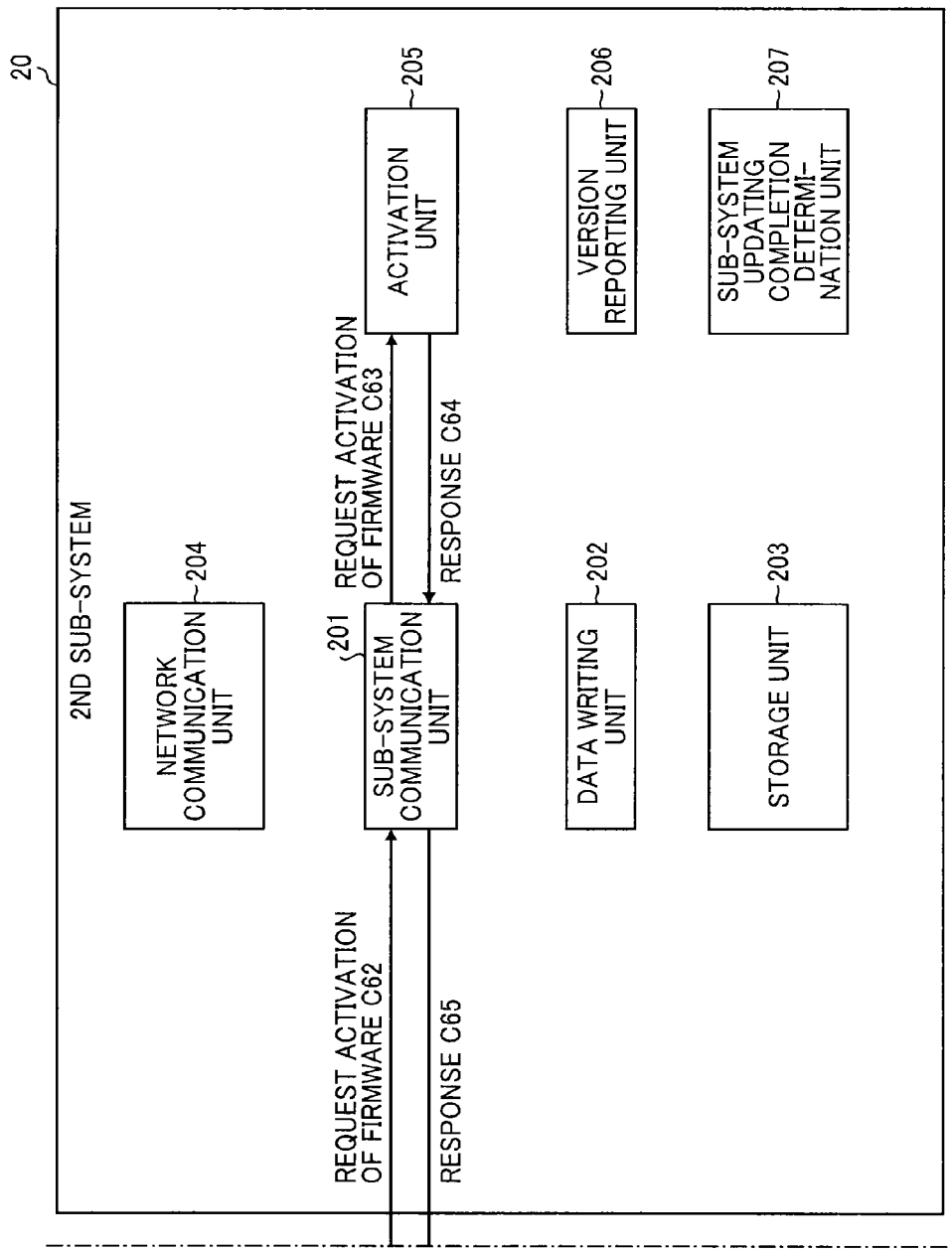

A description is given of a fourth example operation of the information processing apparatus 1, in which it can detect that the most recent updating of firmware is not conducted properly when the information processing apparatus 1 is activated such as when powering the apparatus, and the execution of firmware is prohibited only for a sub-system that is not updated correctly. FIGS. 15A/15B shows steps of process of the fourth example operation that the information processing apparatus 1 conducts.

The operation shown in FIGS. 15A/15B is conducted after conducting the operation described with reference to FIGS. 12A/12B except the operation for locking the firmware (B1 to B2 and C1 to C4 of FIGS. 12A/12B). In the fourth example operation, when the information processing apparatus 1 is activated, it is detected that the updating of firmware is not completed correctly, and then the version information of firmware for each sub-system is received. Further, as described with the first and second example operations, the version information of firmware received at this stage is presently or currently stored version information of firmware for each sub-system, in which some of the received version information of firmware may indicate that the updating of firmware is not completed correctly.

In the operation of FIGS. 15A/15B, based on the received version information, the updating management unit 110 determines whether the updating of firmware is completed correctly at each sub-system (A61), and then the updating management unit 110 reports a determination result to the function-use determination unit 112 as update status (A62).

Upon receiving the update status, the function-use determination unit 112 requests an activation of firmware only to the activation unit of a sub-system that the updating is completed. For example, in the operation of FIGS. 15A/15B, an activation of firmware is requested to the activation unit 105 of the first sub-system 10 (B61), and an activation of firmware is requested to the activation unit 205 of the second sub-system 20 (C61, C62, C63). Such activation of firmware may not be conducted at one of the sub-systems or may not be conducted at both of the sub-systems, as required.

Further, upon receiving the firmware activation request, the activation units 105 and 205 respectively activate the firmware stored in the storage units 103 and 203, and return a response to the function-use determination unit 112 (B62, C64, C65, C66), wherein such response may be an activation-completed response or activation success response. Upon receiving the response from each one of the activation units, the function-use determination unit 112 determines whether a requested operation can be executed with the activated sub-system based on the response (A63).

Figures 16, 17, 18:
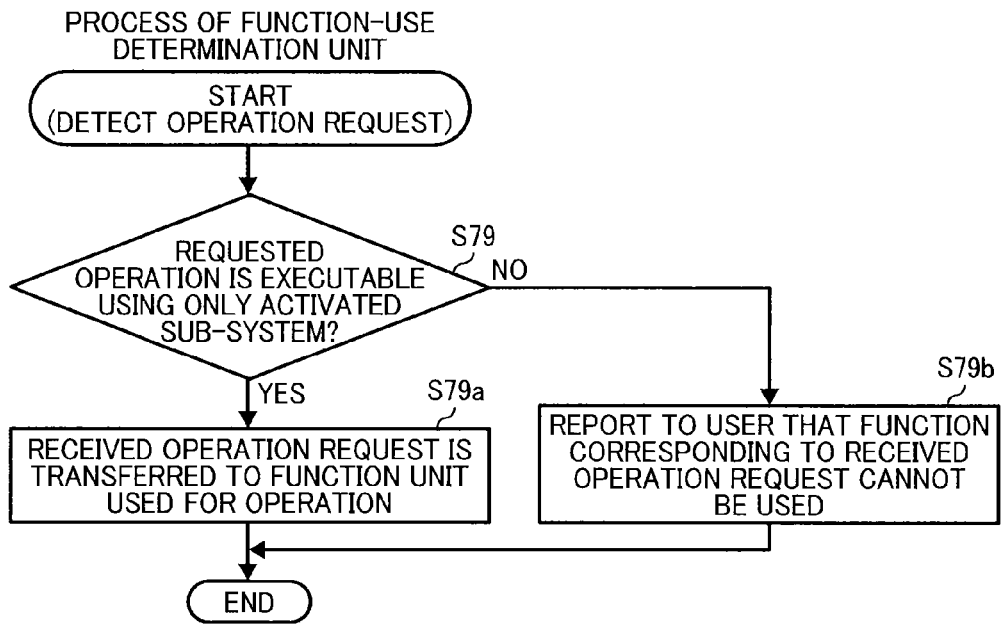
FIG. 16 shows a flowchart of a process of conducted by a function-use determination unit for the fourth example operation to determine whether function of apparatus can be used.
FIG. 17 shows example of data used for the process of FIG. 16 by the function-use determination unit.
FIG. 18 shows example of another data used for the process of FIG. 16 by the function-use determination unit.

FIG. 16 shows a flowchart of steps of process by the function-use determination unit 112, in which it is determined whether a requested operation is executable. Further, the requested operation is a request demanding an execution of operation using the function of any one of the sub-systems of the information processing apparatus 1, wherein such request can be generated by, for example, a unit in the information processing apparatus 1 in response to a user operation, a detection of internal event, and a reception of request from other device such as an external device. For example, if the information processing apparatus 1 is a projector, such request may be a request of image projection start/stop, and change of projection settings, and if the information processing apparatus 1 is a printer, such request may be a request of print start and change of print settings.

Upon detecting the generation of operation request in the information processing apparatus 1, the function-use determination unit 112 starts the process of FIG. 16. At first, upon detecting the requested operation, the function-use determination unit 112 determines whether the requested operation can be executed using only the activated sub-system (S79). If it is determined that the requested operation can be executed (S79: YES), the requested operation is transferred to a function unit that executes such operation (S79a), and then the process ends.

If it is determined that the requested operation cannot be executed (S79: NO), it is reported to a user that function corresponding to the requested operation cannot be used (S79b), in which a response indicating that the operation corresponding to the detected request cannot be executed is returned to a request issuer. Then, the process ends.

FIGS. 17 and 18 show examples of data used at step S71, in which, for example, three sub-systems are used but the numbers of sub-system is not limited thereto. FIG. 17 shows a table correlating each function and each sub-system, in which functions used for requested operation and sub-systems used for executing functions are correlated. FIG. 18 shows a table which sub-system is in active currently. As such, FIG. 17 shows a table of function execution information correlating functions of the information processing apparatus, and data set required to use the functions, which can be stored, for example, in a storage unit of a sub-system.

The table shown in FIG. 17 is typically prepared by a vendor of the information processing apparatus 1 and stored, for example, in the storage unit 103. The table shown in FIG. 18 can be generated by the function-use determination unit 112 based on a response from each activation unit, wherein the response is issued when a firmware activation request is received by each activation unit.

At step S79 of FIG. 16, the function-use determination unit 112 identifies functions required for executing the detected operation request. Then, the table of FIG. 17 is referred by using the identified function as key information to identify which sub-system can be used for the identified function. Then, the table of FIG. 18 is referred by using the identified sub-system as key information, and it is determined whether the sub-system required for executing the identified function is in activation. If all of the sub-systems required for executing the identified function is in activation, the determination result of step S79 of FIG. 16 becomes YES, and if any one of the sub-systems required for executing the identified function is not in activation, the determination result of S79 of FIG. 16 becomes NO.

By conducting the above described processing by the information processing apparatus 1 when the information processing apparatus 1 is activated, only the firmware that has completed the updating can be activated, and then only the function of sub-system corresponding to the update-completed firmware can be set effective. With such a configuration, even if the updating of firmware is not completed correctly for the information processing apparatus 1 as a whole, the functions of the information processing apparatus 1 can be used, at least partially, without causing abnormal operation.

Fifth Example Operation

FIG. 19

A description is given of a fifth example operation of the information processing apparatus 1, in which it can detect that the most recent updating of firmware is not conducted properly when the information processing apparatus 1 is activated, and then a user can set a given operation.

In the fifth example operation, the updating management unit 110 receives a user instruction at a given timing to store given operations to be conducted if the firmware updating is to be failed in the storage unit 103, by which such given operations can be used when the apparatus is activated and the firmware updating is failed. Such given selectively-set operations can be, for example, an activation of the recovery mode (second example operation), an execution of automatic updating (third example operation), and an activation of a specific mode that can use a specific function (fourth example operation).

Figure 19:
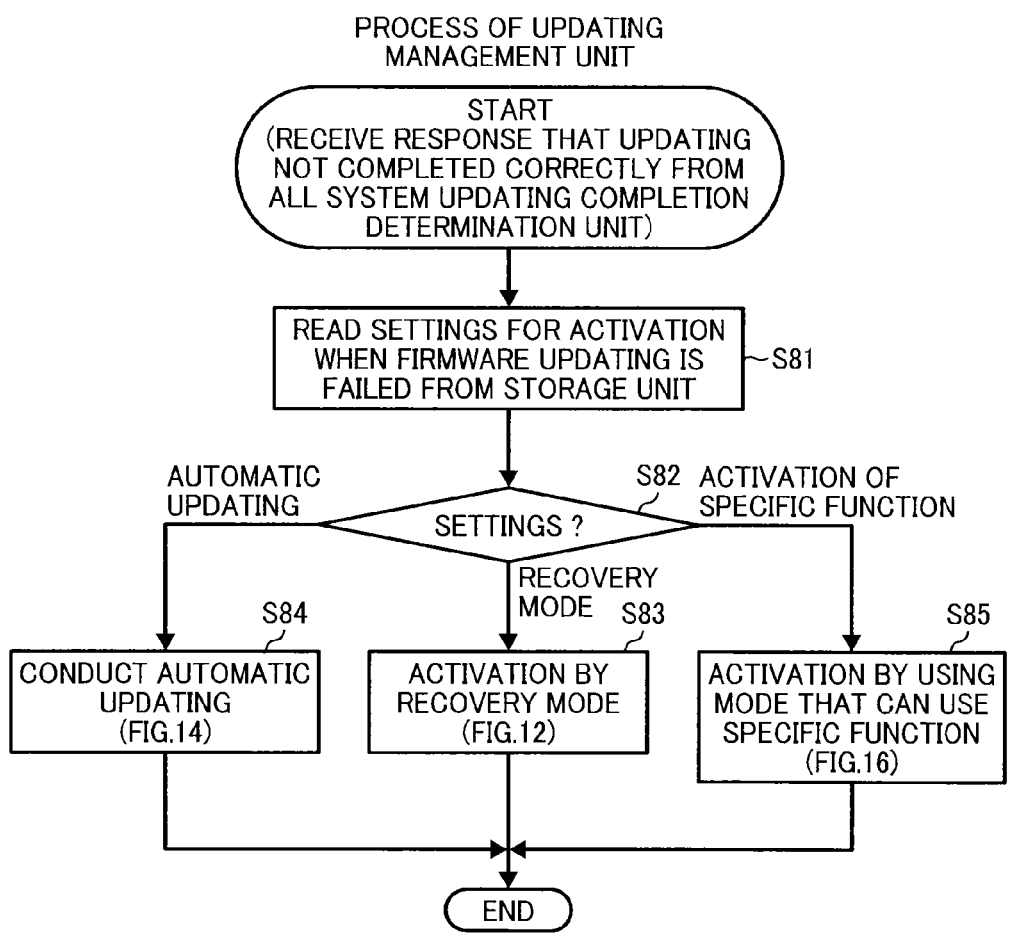
FIG. 19 shows a flowchart of a process conducted by the updating management unit for a fifth example operation.

FIG. 19 shows a flowchart of steps of a process by the updating management unit 110 in the fifth example operation. When the information processing apparatus 1 is activated, at steps X1 to X3 of FIGS. 12A/12B, the updating management unit 110 may receive the response that the updating of firmware is not completed correctly from the all system updating completion determination unit 109, and then the updating management unit 110 starts the process of FIG. 19.

The updating management unit 110 reads out the settings of given operations that can be used when the updating of firmware is failed from the storage unit 103 (S81) when the apparatus is activated. Based on the settings of given operations, the information processing apparatus 1 can conduct any one the operations described in the second to fourth example operations (S82, S83, S84, S85), and such operations can be conducted after conducting steps X1 to X3 of FIGS. 12A/12B. With such a configuration, when detecting that the updating of firmware is not completed correctly, the information processing apparatus 1 can conduct an operation matched to a user needs.

Sixth Example Operation

FIGS. 20, 21

A description is given of a sixth example operation of the information processing apparatus 1, in which when the updating of firmware is not completed correctly, such situation is reported to a user. FIG. 20 shows an operation by the information processing apparatus 1 in the sixth example operation.

Upon detecting that the updating of firmware is not completed correctly for the information processing apparatus 1, the updating management unit 110 collects the version information of firmware from the version reporting unit of each sub-system, and then the updating management unit 110 conducts the process of FIG. 20. For example, the process of FIG. 20 can be started after completing the process described as the second example operation (FIGS. 12A/12B).

However, the start of the process of FIG. 20 is not limited when the information processing apparatus 1 is activated. For example, upon detecting an abnormal event during the updating of firmware and then interrupting the updating, the updating management unit 110 can collect the version information of firmware.

In FIG. 20, based on the collected version information, the updating management unit 110 identifies a sub-system that the updating of firmware is not completed correctly such as failure of updating (A81). Then, the updating management unit 110 transmits updating failure notification to the main reporting unit 104 to report the updating failure at the identified sub-system (A82). Upon receiving the updating failure notification, the main reporting unit 104 controls the display unit 15 to display the updating failure for a user (A83).

Such display can be conducted, for example, by controlling ON/OFF of a light emitting diode (LED) with a detection timing of the updating-failed sub-system as shown in FIG. 21. Further, the updating failure message can be displayed on a liquid crystal display (LCD) or the like. Further, the updating failure message may not be displayed for each sub-system, but can be displayed for the entire information processing apparatus 1 to display the updating of firmware is failed, in which the collection of version information is not required.

Seventh Example Operation

FIGS. 22A/22B, FIG. 23

Figure 22B:
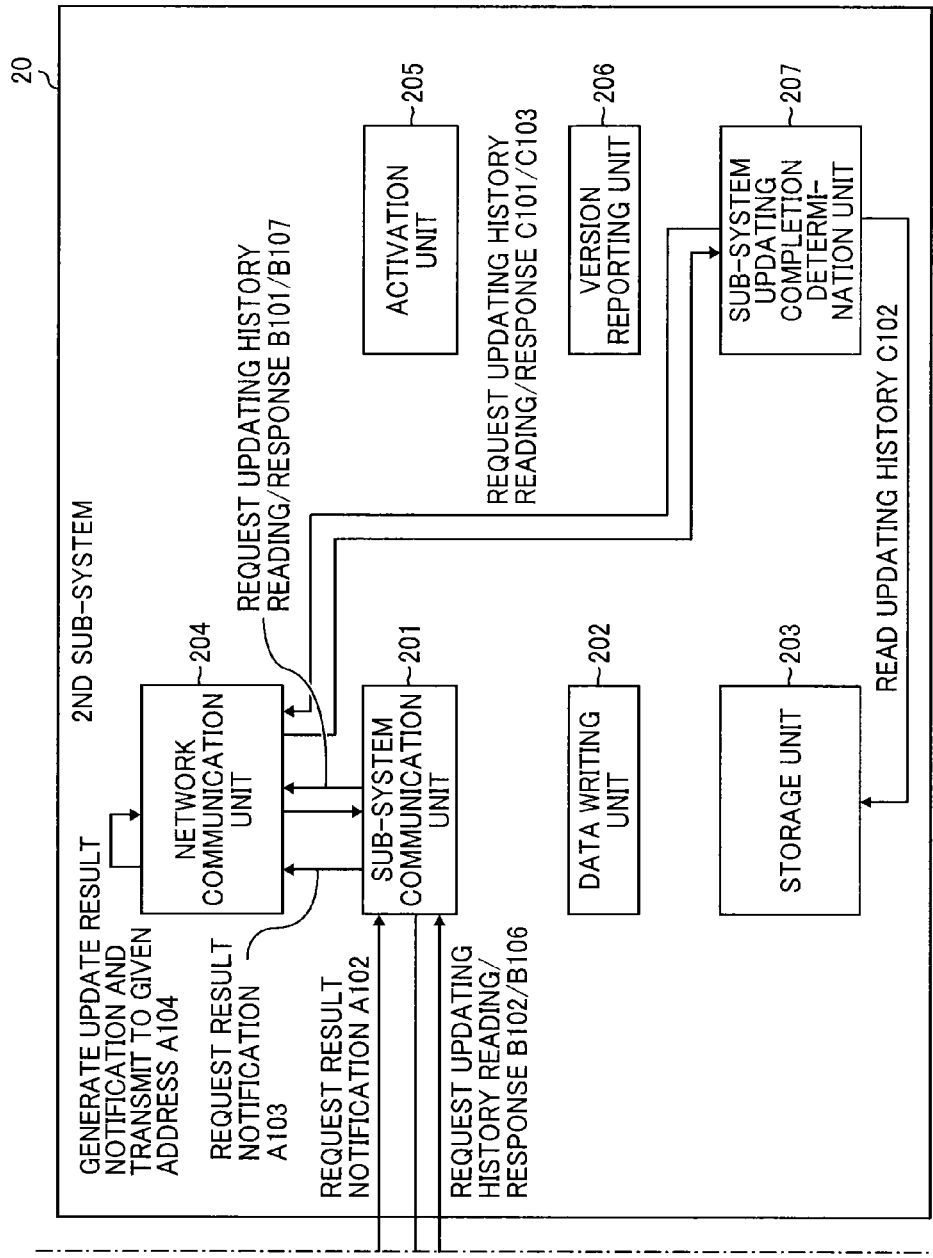
FIGS. 22A/22B show a sequence of operation conducted by the information processing apparatus of FIG. 1 for a seventh example operation.

A description is given of a seventh example operation of the information processing apparatus 1, in which a update result of firmware is reported to a user. FIGS. 22A/22B show an operation by the information processing apparatus 1 in the seventh example operation.

Further, in the seventh example operation, the data writing units 102 and 202 in each sub-system respectively write the updating history information to the storage units 103 and 203 when updating the update flag at steps S11 to S13 in FIG. 7. Specifically, the start time of the updating process is written at step S11, and the end time of the updating process is written at step S13. Therefore, if one updating process includes both of the start time and the end time, it can be assumed that the updating is completed correctly, and if one updating process includes only the start time, it can be assumed that the updating is not completed correctly. The sub-system updating completion determination unit 107 can determine whether the updating is completed correctly by referring the update flag value, the updating history information, or both of them.

In the seventh example operation, upon confirming the completion of the updating of firmware (A22 in FIGS. 6A/6B: including when updating is interrupted), or upon detecting the updating of firmware is not completed correctly when activating the information processing apparatus 1, the information processing apparatus 1 starts the process of FIGS. 22A/22B. In FIGS. 22A/22B, the updating management unit 110 transmits a result notification request to the network communication unit 204 (A101, A102, A103). Upon receiving the result notification request, the network communication unit 204 transmits a updating history reading request to the sub-system updating completion determination units 107 and 207 of each sub-system (B101, B102, B103, C101).

Upon receiving the updating history reading request, the sub-system updating completion determination units 107 and 207 read out the firmware updating history information from the storage units 103 and 203 respectively (B104, C102), and transmits the response to the network communication unit 204 (B105, B106, B107, C103). Upon receiving the response, the network communication unit 204 generates a update result notification message shown in FIG. 23 based on the received firmware updating history information of each sub-system, and transmits the update result notification message to a given predetermined address (A104).

Figures 23, 24, 25:
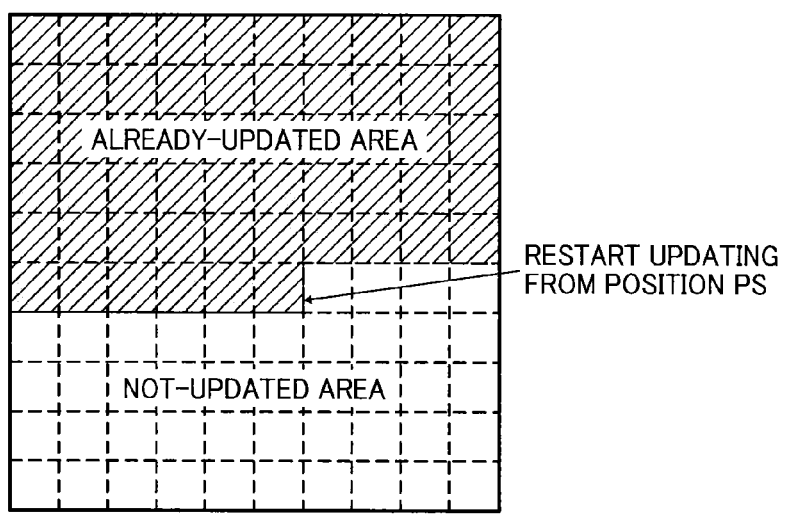
FIG. 23 shows an example of message of a update result notification.
FIG. 24 shows an example of data indicating firmware updating progress status.
FIG. 25 schematically shows a data area for storing firmware, in which a re-start position of updating is shown.

FIG. 23 shows one example message of updating failure of the entire apparatus, in which the updating is completed in the sub-system 1 such as first sub-system 10, but the updating is failed two times consecutively for the sub-system 2 such as second sub-system 20, and then the retry operation is stopped. Such message can be described using any types of format and transmission protocol. Although an e-mail message is used for FIG. 23, the message is not limited thereto.

Further, in FIGS. 22A/22B, the history notification, transmitted from the sub-system updating completion determination units 107 to the network communication unit 204, may only include information related to the latest updating retry operation, which is to be used as a update result notification message. By conducting the above-described operation in the information processing apparatus 1, the result of the updating of firmware such as updating completion or updating failure can be reported to a user. Further, the result of the updating of firmware may not be reported for each sub-system, but can be reported for the entire information processing apparatus 1 similar to the sixth example operation.

Variant Example

FIGS. 24, 25

A description is given of variant example of the present invention. Specifically, when the retry operation is conducted for the updating of firmware, the writing of update-use firmware by the data writing unit 102 can be resumed or re-started from a position next to a data position updated by the most recent updating operation. In this case, for example, the version information included in update-use firmware, the updated byte number, and the total byte number may be managed as updating progress status information as shown in FIG. 24. Such updating progress status information can be stored in the storage unit 103, and the updated byte number can be updated at a given timing such as when a given numbers of byte (e.g., one byte) is written. Further, the version information is updated when to start the updating process.

When the retry operation of updating is conducted, the data shown in FIG. 24 is referred. When to re-start the writing of the update-use firmware having the same version stored in the table of FIG. 24, the writing can be re-started from the data position next to a data position updated by the most recent updating operation.

As shown in FIG. 25, the writing of the update-use firmware in the already-updated area is not required, but the writing of the update-use firmware can be started from the position PS, which is the position next to the last writing position by the most recent updating operation, and the update-use firmware is written from the position PS and subsequent positions. With such processing, data that has been written already can be used without re-writing, by which the updating time for the retry operation can be set shorter.

In the above described example embodiments, firmware is updated as the updating target, but the updating target is not limited to firmware or programs. For example, the updating target can be any data set having version information. Further, the numbers of data set for each sub-system of the information processing apparatus 1 is not limited one data set. As long as the version is managed for each types of data set, a plurality of data set can be set and updated in one sub-system.

Further, the above described example embodiment can be applied to an information processing apparatus having no specific sub-system, or an entire of information processing apparatus that update one data set. Further, an information processing apparatus may include a sub-system not having updating-target data set. Further, an information processing apparatus may include sub-systems for any numbers other than two. Further, the update-use data that the update-input unit 108 receives may not necessary include the update-use data for all data set. If the update-use data is included only in some data set, the updating process is conducted for only for such data set.

As above described, the above described information processing apparatus can include a updating function for data set, and the above described information processing apparatus can be applied to electronic apparatus or devices that has an information processing function. For example, the above described information processing apparatus can be applied to network appliances, vending machines, medical apparatuses, power supply systems, air-conditioning systems, metering systems of gas, water, and electricity, automobiles, airplanes, and general-purpose computers, or the like. Further, the above described example operations of example embodiment, and variant example can be combined as required.

In the above described information processing apparatus, it can determine whether updating of data set having version information is required or not, in which even if the updating is interrupted, such situation can be automatically detected, and then the updating matched to such situation can be conducted.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium or carrier medium for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/ software combination. In example embodiment, processing units, computing units, or controllers can be configured with using various types of processors, circuits, or the like such as a programmed processor, a circuit, an application specific integrated circuit (ASIC), used singly or in combination.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An information processing apparatus, comprising:
a storage unit, using a hardware processing device, to store a data set including version information of the data set;
an acquiring unit, using the hardware processing device, to acquire an update-use data set including corresponding version information; a providing unit, using the hardware processing device, to provide the version information of the data set read from the storage unit; an updating management unit, using the hardware processing device, to determine whether updating of the data set stored in the storage unit is required, wherein when the updating management unit determines that updating is required based on the version information of the update-use data set, acquired by the acquiring unit, and the version information provided by the providing unit, the updating management unit updates the data set stored in the storage unit using the update-use data set;
an updating completion determination unit, using the hardware processing device, to determine whether the updating of data set by the updating management unit is completed, wherein when the updating completion determination unit determines that the updating of the data set is not completed correctly, the providing unit provides specific version information indicating the updating is not completed correctly to the updating management unit instead of the version information of data set stored in the storage unit;
a plurality of control systems; and
a function-use determination unit, using the hardware processing device, to determine condition information of a data set for each of the plurality of control systems, the condition information for each of the plurality of control systems based upon whether the updating of a data set for a respective control system is completed correctly, wherein upon activation of the information processing apparatus, if the updating of the data set for the respective control system is completed correctly, the respective data set and the respective control system are activated.

2. The information processing apparatus of claim 1, wherein when the updating completion determination unit determines that updating of data set by the updating management unit is not completed correctly upon activating the information processing apparatus, the updating management unit instructs the acquiring unit to acquire the update-use data set,
wherein when the updating management unit determines that updating is required based on the acquired version information of update-use data set and the version information provided by the providing unit, the updating management unit updates the data set stored in the storage unit using the acquired update-use data set.

3. The information processing apparatus of claim 1, further comprising a plurality of storage units to store a data set including corresponding version information,
wherein the acquiring unit acquires update-use data set to update data set stored in at least one of the plurality of storage units,
wherein the providing unit provides the version information of data set read from each one of the plurality of storage units,
wherein the updating management unit determines whether updating is required for each one of the storage units based on the version information of each one of update-use data set acquired by the acquiring unit and the version information of data set provided by the providing unit, and updates data set for each one of the storage units if updating is required, and
wherein the updating completion determination unit determines whether updating of data set stored in the storage units is completed for each one of the storage units.

4. The information processing apparatus of claim 3, further comprising a prohibiting unit using the hardware processing device,
wherein when the updating completion determination unit determines that updating of data set by the updating management unit is not completed correctly in at least one of the storage units upon activating the information processing apparatus, the prohibiting unit prohibits a use of data set stored in the at least one of the storage units not completed the updating correctly.

5. The information processing apparatus of claim 4,
wherein function execution information correlating a function of the information processing apparatus and a data set required for using the function is stored in at least one of the storage units,
wherein the function-use determination unit determines whether a function requested to the information processing apparatus can be used without using the data set that is prohibited for use by the prohibiting unit by referring the function execution information when the information processing apparatus is requested to use the requested function,
wherein the function-use determination unit allows a use of the requested function when the requested function can be used, and the function-use determination unit does not allow a use of the requested function when the requested function cannot be used.

6. The information processing apparatus of claim 3, further comprising a prohibiting unit using the hardware processing device,
wherein when the updating completion determination unit determines that updating of data set by the updating management unit is not completed correctly in at least one of the storage units upon activating the information processing apparatus, the prohibiting unit prohibits a use of data set stored in all of the storage units.

7. The information processing apparatus of claim 1,
wherein the storage unit stores updating progress status of the data set conducted by the updating management unit,
wherein when the updating completion determination unit determines that updating of data set by the updating management unit is not completed correctly upon activating the information processing apparatus,
the updating management unit conducts updating of data set stored in the storage unit from a position next to a data position updated by the most recent updating operation based on updating progress status stored in the storage unit.

8. The information processing apparatus of claim 3, further comprising a plurality of sub-systems,
wherein each of the control systems is corresponded to one of the sub-systems,
wherein each of the storage units is corresponded to one of the sub-systems, and
wherein the data set is firmware executable by using each of the sub-systems.

9. A computer executed method of managing data set used for information processing apparatus, comprising the steps of:
storing a data set including version information of the data set in a storage unit;
acquiring an update-use data set including corresponding version information;
providing the version information of the data set read from the storage unit;
determining whether updating of the data set stored in the storage unit is required, wherein the determining determines that updating is required based on the version information of the acquired update-use data set and the provided version information, in which updating the data set stored in the storage unit using the update-use data set;
determining whether the updating of data set is completed, wherein when determined that the updating of the data set is not completed correctly, providing specific version information indicating the updating is not completed correctly instead of the version information of data set stored in the storage unit;
determining condition information of a data set for each of a plurality of control systems of the information processing apparatus, the condition information for each of the plurality of control systems based upon whether the updating of a data set for a respective control system is completed correctly; and
activating the respective data set and the respective control system upon activation of the information processing apparatus if the updating of the data set for the respective control system is completed correctly.

10. The computer executed method of claim 9, further comprising:
when it is determined that updating of data set is not completed correctly upon activating the information processing apparatus, instructing to acquire the update-use data set,
when it is determined that updating is required based on the acquired version information of update-use data set and the provided version information,
updating the data set stored in the storage unit using the acquired update-use data set.

11. The computer executed method of claim 9, further comprising:
storing a data set including corresponding version information in a plurality of storage units, acquiring update-use data set to update data set stored in at least one of the plurality of storage units,
providing the version information of data set read from each one of the plurality of storage units, determining whether updating is required for each one of the storage units based on the acquired version information of each one of update-use data set and the provided version information of data set, and updating data set for each one of the storage units if updating is required, and
determining whether updating of data set stored in the storage units is completed for each one of the storage units.

12. The computer executed method of claim 11, further comprising:
when it is determined that updating of data set is not completed correctly in at least one of the storage units upon activating the information processing apparatus, prohibiting a use of data set stored in the at least one of the storage units not completed the updating correctly.

13. The computer executed method of claim 12, further comprising:
determining a function-use, wherein function execution information correlating a function of the information processing apparatus and a data set required for using the function is stored in at least one of the storage units,
determining whether a function requested to the information processing apparatus can be used without using the data set that is prohibited for use by the prohibiting by referring the function execution information when the information processing apparatus is requested to use the requested function,
allowing a use of the requested function when the requested function can be used, and the determining of function-use does not allow a use of the requested function when the requested function cannot be used.

14. The computer executed method of claim 11, further comprising:
when determined that updating of data set is not completed correctly in at least one of the storage units upon activating the information processing apparatus, prohibiting a use of data set stored in all of the storage units.

15. A non-transitory computer-readable storage medium storing a program that, when executed by a computer, causes the computer to execute a method of managing data set used for information processing apparatus, comprising the steps of:
storing a data set including version information of the data set in a storage unit;
acquiring an update-use data set including corresponding version information;
providing the version information of the data set read from the storage unit;
determining whether updating of the data set stored in the storage unit is required,
wherein the determining determines that updating is required based on the version information of the acquired update-use data set and the provided version information, in which updating the data set stored in the storage unit using the update-use data set;
determining whether the updating of data set is completed, wherein when determined that the updating of the data set is not completed correctly, providing specific version information indicating the updating is not completed correctly instead of the version information of data set stored in the storage unit;

determining condition information of a data set for each of a plurality of control systems of the information processing apparatus, the condition information for each of the plurality of control systems based upon whether the updating of a data set for a respective control system is completed correctly; and activating the respective data set and the respective control system upon activation of the information processing apparatus if the updating of the data set for the respective control system is completed correctly.

\* \* \* \* \*